US006385724B1

(12) United States Patent
Beckman et al.

(10) Patent No.: US 6,385,724 B1
(45) Date of Patent: May 7, 2002

(54) AUTOMATIC OBJECT CALLER CHAIN WITH DECLARATIVE IMPERSONATION AND TRANSITIVE TRUST

(75) Inventors: Brian C. Beckman, Newcastle; Anthony D. Andrews; Alexander A. Armanasu, both of Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/201,276

(22) Filed: Nov. 30, 1998

(51) Int. Cl.⁷ .............................................. G06F 01/24
(52) U.S. Cl. ...................... 713/167; 713/152; 713/168; 713/169; 713/170; 380/247; 380/257
(58) Field of Search ................................. 713/152, 167, 713/168, 169, 170, 182; 380/247, 257

(56) References Cited

U.S. PATENT DOCUMENTS

| | | |
|---|---|---|
| 4,752,928 A | 6/1988 | Chapman et al. |
| 4,807,111 A | 2/1989 | Cohen et al. |
| 5,016,166 A | 5/1991 | Van Loo et al. |
| 5,075,848 A | 12/1991 | Lai et al. |
| 5,093,914 A | 3/1992 | Coplien et al. |
| 5,125,091 A | 6/1992 | Staas, Jr. et al. |
| 5,133,075 A | 7/1992 | Risch |
| 5,151,987 A | 9/1992 | Abraham et al. |
| 5,168,441 A | 12/1992 | Onarheim et al. |
| 5,179,702 A | 1/1993 | Spix et al. |

(List continued on next page.)

FOREIGN PATENT DOCUMENTS

| | | |
|---|---|---|
| EP | 0559100 A2 | 2/1993 |
| EP | 0638863 A1 | 8/1994 |
| EP | 0777178 A1 | 4/1997 |

OTHER PUBLICATIONS

"Single–threaded Apartments," microsoft.com website, pp. 1–2, May 26, 1998.
"Using Secure RPC," MSDN Library CD, pp. 1–7, Apr. 1998.
"FAQ:COM Security Frequently Asked Questions," MSDN Library CD, pp. 1–10, Apr. 1998.
"Using DCOM Security," MSDN Library CD, pp. 1–5, Apr. 1998.
Comparing Microsoft Transaction Server to Enterprise Java-Beans: White Paper, pp. 1–15, Jul. 1998.
Brown et al., "Distributed Component Object model Protocol—DCOM/1.0," http://globecom.net/ietf/draft/draft–brown–dcom–v1–spec–03.html, pp. 1–52, Jan. 1998.

(List continued on next page.)

Primary Examiner—Thomas R. Peeso
(74) Attorney, Agent, or Firm—Klarquist Sparkman, LLP

(57) ABSTRACT

An object-based security framework provides automatic caller chain building to track the identity of upstream callers. An application developer can define impersonation settings declaratively using a graphical interface. At runtime, logic outside the application objects handles the caller chain and impersonation, relieving the developer from having to incorporate impersonation logic into the application. A group of special identities are permitted to provide identities of others without themselves being recorded in the chain when the chain traverses a method invocation queue. The framework supports a copy style for the chain to support various caller scenarios. Additionally, a minimum authentication level can be enforced throughout the chain. The caller chain can be used in conjunction with roles, and objects may consult the chain programmatically to enforce a custom security scheme.

26 Claims, 18 Drawing Sheets

U.S. PATENT DOCUMENTS

| | | | |
|---|---|---|---|
| 5,181,162 A | 1/1993 | Smith et al. | |
| 5,210,874 A | 5/1993 | Karger | |
| 5,212,793 A | 5/1993 | Donica et al. | |
| 5,247,675 A | 9/1993 | Farrell et al. | |
| 5,313,638 A | 5/1994 | Ogle et al. | |
| 5,315,703 A | 5/1994 | Matheny et al. | |
| 5,339,415 A | 8/1994 | Strout, II et al. | |
| 5,421,013 A | 5/1995 | Smith | |
| 5,434,975 A | 7/1995 | Allen | |
| 5,442,791 A | 8/1995 | Wrabetz et al. | |
| 5,455,953 A | 10/1995 | Russell | |
| 5,459,837 A | 10/1995 | Caccavale | |
| 5,463,625 A | 10/1995 | Yasrebi | |
| 5,481,715 A | 1/1996 | Hamilton et al. | 395/700 |
| 5,485,617 A | 1/1996 | Stutz et al. | |
| 5,493,728 A | 2/1996 | Solton et al. | |
| 5,504,898 A | 4/1996 | Klein | |
| 5,519,867 A | 5/1996 | Moeller et al. | |
| 5,524,238 A | 6/1996 | Miller et al. | |
| 5,555,368 A | 9/1996 | Orton et al. | |
| 5,555,388 A | 9/1996 | Shaughnessy | |
| 5,560,029 A | 9/1996 | Papadopoulos et al. | |
| 5,574,862 A | 11/1996 | Marianetti, II | |
| 5,574,918 A | 11/1996 | Hurley et al. | |
| 5,577,251 A | 11/1996 | Hamilton et al. | 395/942.07 |
| 5,577,252 A | 11/1996 | Nelson et al. | 395/670 |
| 5,579,520 A | 11/1996 | Bennett | |
| 5,581,760 A | 12/1996 | Atkinson et al. | |
| 5,598,562 A | 1/1997 | Cutler et al. | |
| 5,603,063 A | 2/1997 | Au | |
| 5,630,136 A | 5/1997 | Davidson et al. | |
| 5,675,796 A | 10/1997 | Hodges et al. | |
| 5,687,370 A | 11/1997 | Garst et al. | |
| 5,689,708 A | 11/1997 | Regnier et al. | 395/682 |
| 5,717,439 A | 2/1998 | Levine et al. | |
| 5,742,822 A | 4/1998 | Motomura | |
| 5,752,038 A | 5/1998 | Blake et al. | |
| 5,758,281 A * | 5/1998 | Emery et al. | 455/428 |
| 5,764,747 A * | 6/1998 | Yue et al. | 379/210 |
| 5,764,918 A * | 6/1998 | Poulter | 709/236 |
| 5,765,174 A | 6/1998 | Bishop | |
| 5,768,348 A * | 6/1998 | Solomon et al. | 379/67.1 |
| 5,778,365 A | 7/1998 | Nishiyama | |
| 5,787,281 A | 7/1998 | Schreiber et al. | |
| 5,790,789 A | 8/1998 | Suarez | |
| 5,794,038 A | 8/1998 | Stutz et al. | |
| 5,802,291 A | 9/1998 | Balick et al. | |
| 5,815,665 A | 9/1998 | Teper et al. | |
| 5,822,435 A | 10/1998 | Boebert et al. | 380/49 |
| 5,832,274 A | 11/1998 | Cutler et al. | 395/712 |
| 5,838,916 A | 11/1998 | Domenikos et al. | 395/200.49 |
| 5,864,683 A | 1/1999 | Boebert et al. | |
| 5,881,225 A | 3/1999 | Worth | |
| 5,884,316 A | 3/1999 | Bernstein et al. | |
| 5,889,942 A | 3/1999 | Orenshteyn | |
| 5,890,161 A | 3/1999 | Helland et al. | 703/103 |
| 5,907,675 A | 5/1999 | Aahlad | |
| 5,941,947 A | 8/1999 | Brown et al. | |
| 5,958,010 A | 9/1999 | Agarwal et al. | |
| 6,014,666 A | 1/2000 | Helland et al. | 707/9 |
| 6,026,428 A | 2/2000 | Hutchison et al. | |
| 6,061,796 A | 5/2000 | Chen et al. | |
| 6,105,147 A | 8/2000 | Molloy | |
| 6,134,594 A | 10/2000 | Helland et al. | |
| 6,167,423 A | 12/2000 | Chopra et al. | |
| 6,182,108 B1 | 1/2001 | Williams et al. | |

OTHER PUBLICATIONS

Asche, "Windows NT Security in Theory and Practice," Microsoft Developer Network CD, pp. 1–12, Jul. 1996.

"CoInitializeSecurity," Microsoft Developer Network CD, pp. 1–2, Jul. 1996.

"Security and Scalability," Microsoft Developer Network CD, p. 1, Jul. 1996.

"RPC_C_IMP_Level_xxx," Microsoft Developer Network CD, p. 1, Jul. 1996.

"RPC_C_AUTHN_xxx," Microsoft Developer Network CD, p. 1, Jul. 1996.

"CoRegisterAuthenticationServices," Microsoft Developer Network CD, p. 1, Jul. 1996.

Bochenski, *IBM's SystemView,* Computer Technology Research Corp., pp. 1–27, 29–65, 67–79, 81–91, 93–103, 105–115, 117–139, 141–143, 1991.

Franklin, "Concurrency Control and Recovery," *The Computer Science and Engineering Handbook,* Tucker, Jr. (ed.), pp. 1058–1077, 1996.

*Java Remote Method Invocation,* http://java.sun.com/products/jdk/1.2/docs/guide/rmi/spec/rmiTOC.doc.html, pp. 1–3, Dec. 1997.

"Introduction," *Java Remote Method Invocation,* http://java.sun.com/products/jdk/1.2/docs/guide/rmi/spec/rmi–intro.doc.html, p. 1, Dec. 1997.

"Overview," *Java Remote Method Invocation,* http://java.sun.com/products/jdk/1.2/docs/guide/rmi/spec/rmi–intro.doc1.html, p. 1, Dec. 1997.

"System Goals," *Java Remote Method Invocation,* http://java.sun.com/products/jdk/1.2/docs/guide/rmi/spec/rmi–intro.doc2.html, p. 1, Dec. 1997.

"Java Distributed Object Model," *Java Remote Method Invocation,* http://java.sun.com/products/jdk/1.2/docs/guide/rmi/spec/rmi–objmodel.doc.html, p. 1, Dec. 1997.

"Definition of Terms," *Java Remote Method Invocation,* http://java.sun.com/products/jdk/1.2/docs/guide/rmi/spec/rmi–objmodel.doc1.html, p. 1, Dec. 1997.

"The Distributed and Nondistributed Models Constrasted," *Java Remote Method Invocation,* http://java.sun.com/products/jdk/1.2/docs/guide/rmi/spec/rmi–objmodel.doc2.html, p. 1, Dec. 1997.

"RMI Interfaces and Classes," *Java Remote Method Invocation,* http://java.sun.com/products/jdk/1.2/docs/guide/rmi/spec/rmi–objmodel.doc3.html, pp. 1–2,Dec. 1997.

"Implementing a Remote Interface," *Java Remote Method Invocation,* http://java.sun.com/products/jdk/1.2/docs/guide/rmi/spec/rmi–objmodel.doc4.html, pp. 1–2, Dec. 1997.

"Server Interfaces," *Java Remote Method Invocation,* http://java.sun.com/products/jdk/1.2/docs/guide/rmi/spec/rmi–server.doc.html, p. 1, Dec. 1997.

"The RemoteObject Class," *Java Remote Method Invocation,* http://java.sun.com/products/jdk/1.2/docs/guide/rmi/spec/rmi–server.doc1.html, pp. 1–2, Dec. 1997.

"The RemoteServer Class," *Java Remote Method Invocation,* http://java.sun.com/products/jdk/1.2/docs/guide/rmi/spec/rmi–server.doc2.html, pp. 1–2, Dec. 1997.

"The SocketType Class," *Java Remote Method Invocation,* http://java.sun.com/products/jdk/1.2/docs/guide/rmi/spec/rmi–server.doc3.html, pp. 1–4, Dec. 1997.

"The UnicastRemoteObject Class," *Java Remote Method Invocation,* http://java.sun.com/products/jdk/1.2/docs/guide/rmi/spec/rmi–server.doc4.html, pp. 1–3, Dec. 1997.

"The Unreferenced Interface," *Java Remote Method Invocation,* http://java.sun.com/products/jdk/1.2/docs/guide/rmi/spec/rmi–server.doc5.html, p. 1, Dec. 1997.

"The RMISecurityManager Class," *Java Remote Method Invocation,* http://java.sun.com/products/jdk/1.2/docs/guide/rmi/spec/rmi–server.doc6.html, pp. 1–5, Dec. 1997.

"The RMIClassLoader Class," *Java Remote Method Invocation,* http://java.sun.com/products/jdk/1.2/docs/guide/rmi/spec/rmi–server.doc7.html, pp. 1–2, Dec. 1997.

"The Loaderhandler Interface," *Java Remote Method Invocation,* http://java.sun.com/products/jdk/1.2/docs/guide/rmi/spec/rmi–server.doc8.html, p. 1, Dec. 1997.

"The RMISocketFactory Class," *Java Remote Method Invocation,* http://java.sun.com/products/jdk/1.2/docs/guide/rmi/spec/rmi–server.doc9.html, pp. 1–2, Dec. 1997.

"The RMIFailureHandler Interface," *Java Remote Method Invocation,* http://java.sun.com/products/jdk/1.2/docs/guide/rmi/spec/rmi–server.doc10.html, p. 1, Dec. 1997.

"The LogStream Class," *Java Remote Method Invocation,* http://java.sun.com/products/jdk/1.2/docs/guide/rmi/spec/rmi–server.doc11.html, pp. 1–2, Dec. 1997.

"Stub and Skeleton Compiler," *Java Remote Method Invocation,* http://java.sun.com/products/jdk/1.2/docs/guide/rmi/spec/rmi–server.doc12.html, p. 1, Dec. 1997.

"Registry Interfaces," *Java Remote Method Invocation,* http://java.sun.com/products/jdk/1.2/docs/guide/rmi/spec/rmi–registry.doc.html, p. 1, Dec. 1997.

"The Registry Interface," *Java Remote Method Invocation,* http://java.sun.com/products/jdk/1.2/docs/guide/rmi/spec/rmi–registry.doc1.html, pp. 1–2, Dec. 1997.

"The LocateRegistry Class," *Java Remote Method Invocation,* http://java.sun.com/products/jdk/1.2/docs/guide/rmi/spec/rmi–registry.doc2.html, pp. 1–2, Dec. 1997.

"The RegistryHandler Interface," *Java Remote Method Invocation,* http://java.sun.com/products/jdk/1.2/docs/guide/rmi/spec/rmi–registry.doc3.html, p. 1, Dec. 1997.

"Remote Object Activation," *Java Remote Method Invocation,* http://java.sun.com/products/jdk/1.2/docs/guide/rmi/spec/rmi–activation.doc.html, p. 1, Dec. 1997.

"Overview," *Java Remote Method Invocation,* http://java.sun.com/products/jdk/1.2/docs/guide/rmi/spec/rmi–activation.doc1.html, pp. 1–2, Dec. 1997.

"Activation Protocol," *Java Remote Method Invocation,* http://java.sun.com/products/jdk/1.2/docs/guide/rmi/spec/rmi–activation.doc2.html, pp. 1–2, Dec. 1997.

"Implementation Model for an "Activatable" Remote Object," *Java Remote Method Invocation,* http://java.sun.com/products/jdk/1.2/docs/guide/rmi/spec/rmi–activation.doc3.html, pp. 1–12, Dec. 1997.

"Activation Interfaces," *Java Remote Method Invocation,* http://java.sun.com/products/jdk/1.2/docs/guide/rmi/spec/rmi–activation.doc4.html, pp. 1–14, Dec. 1997.

"Stub/Skeleton Interfaces," *Java Remote Method Invocation,* http://java.sun.com/products/jdk/1.2/docs/guide/rmi/spec/rmi–stubs.doc.html, p. 1, Dec. 1997.

"The RemoteStub Class," *Java Remote Method Invocation,* http://java.sun.com/products/jdk/1.2/docs/guide/rmi/spec/rmi–stubs.doc1.html, p. 1, Dec. 1997.

"The RemoteCall Interface," *Java Remote Method Invocation,* http://java.sun.com/products/jdk/1.2/docs/guide/rmi/spec/rmi–stubs.doc2.html, pp. 1–2, Dec. 1997.

"The RemoteRef Interface," *Java Remote Method Invocation,* http://java.sun.com/products/jdk/1.2/docs/guide/rmi/spec/rmi–stubs.doc3.html, pp. 1–2, Dec. 1997.

"The ServerRef Interface," *Java Remote Method Invocation,* http://java.sun.com/products/jdk/1.2/docs/guide/rmi/spec/rmi–stubs.doc4.html, p. 1, Dec. 1997.

"The Skeleton Interface," *Java Remote Method Invocation,* http://java.sun.com/products/jdk/1.2/docs/guide/rmi/spec/rmi–stubs.doc5.html, p. 1, Dec. 1997.

"The Operation Class," *Java Remote Method Invocation,* http://java.sun.com/products/jdk/1.2/docs/guide/rmi/spec/rmi–stubs.doc6.html, p. 1, Dec. 1997.

"Garbage Collector Interfaces," *Java Remote Method Invocation,* http://java.sun.com/products/jdk/1.2/docs/guide/rmi/spec/rmi–dgc.doc.html, p. 1, Dec. 1997.

"The Interface DGC," *Java Remote Method Invocation,* http://java.sun.com/products/jdk/1.2/docs/guide/rmi/spec/rmi–dgc.doc1.html, pp. 1–2, Dec. 1997.

"The Lease Class," *Java Remote Method Invocation,* http://java.sun.com/products/jdk/1.2/docs/guide/rmi/spec/rmi–dgc.doc2.html, p. 1, Dec. 1997.

"The ObjID Class," *Java Remote Method Invocation,* http://java.sun.com/products/jdk/1.2/docs/guide/rmi/spec/rmi–dgc.doc3.html, pp. 1–2, Dec. 1997.

"The UID Class," *Java Remote Method Invocation,* http://java.sun.com/products/jdk/1.2/docs/guide/rmi/spec/rmi–dgc.doc4.html, pp. 1–2, Dec. 1997.

"The VMID Class," *Java Remote Method Invocation,* http://java.sun.com/products/jdk/1.2/docs/guide/rmi/spec/rmi–dgc.doc5.html, pp. 1–2, Dec. 1997.

"RMI Wire Protocol," *Java Remote Method Invocation,* http://java.sun.com/products/jdk/1.2/docs/guide/rmi/spec/rmi–protocol.doc.html, p. 1, Dec. 1997.

"Overview," *Java Remote Method Invocation,* http://java.sun.com/products/jdk/1.2/docs/guide/rmi/spec/rmi–protocol.doc1.html, p. 1, Dec. 1997.

"RMI Transport Protocol," *Java Remote Method Invocation,* http://java.sun.com/products/jdk/1.2/docs/guide/rmi/spec/rmi–protocol.doc2.html, pp. 1–3, Dec. 1997.

"RMI's Use of Object Serialization Protocol," *Java Remote Method Invocation,* http://java.sun.com/products/jdk/1.2/docs/guide/rmi/spec/rmi–protocol.doc3.html, pp. 1–2, Dec. 1997.

"RMI's Use of HTTP Post Protocol," *Java Remote Method Invocation,* http://java.sun.com/products/jdk/1.2/docs/guide/rmi/spec/rmi–protocol.doc4.html, p. 1, Dec. 1997.

"Application Specific Values for RMI," *Java Remote Method Invocation,* http://java.sun.com/products/jdk/1.2/docs/guide/rmi/spec/rmi–protocol.doc5.html, p. 1, Dec. 1997.

"RMI's Multiplexing Protocol," *Java Remote Method Invocation,* http://java.sun.com/products/jdk/1.2/docs/guide/rmi/spec/rmi–protocol.doc6.html, pp. 1–6 Dec. 1997.

"Exceptions During Remote Object Export," *Java Remote Method Invocation,* http://java.sun.com/products/jdk/1.2/docs/guide/rmi/spec/rmi–exceptions.doc1.html, pp. 1–2, Dec. 1997.

"Exceptions During RMI Call," *Java Remote Method Invocation,* http://java.sun.com/products/jdk/1.2/docs/guide/rmi/spec/rmi–exceptions.doc2.html, p. 1, Dec. 1997.

"Possible Causes of java.rmi.ServerException," *Java Remote Method Invocation,* http://java.sun.com/products/jdk/1.2/docs/guide/rmi/spec/rmi–exceptions.doc4.html, p. 1, Dec. 1997.

"Naming Exceptions," *Java Remote Method Invocation,* http://java.sun.com/products/jdk/1.2/docs/guide/rmi/spec/rmi–exceptions.doc5.html, p. 1, Dec. 1997.

"Other Exceptions, " *Java Remote Method Invocation,* http://java.sun.com/products/jdk/1.2/docs/guide/rmi/spec/rmi–exceptions.doc6.html, p. 1, Dec. 1997.

"Properties in RMI, " *Java Remote Method Invocation*, http://java.sun.com/products/jdk/1.2/docs/guide/rmi/spec/rmi–properties.doc.html, p. 1, Dec. 1997.

"Server Properties," *Java Remote Method Invocation*, http://java.sun.com/products/jdk/1.2/docs/guide/rmi/spec/rmi–properties.doc1.html, p. 1, Dec. 1997.

"Activation Properties," *Java Remote Method Invocation*, http://java.sun.com/products/jdk/1.2/docs/guide/rmi/spec/rmi–properties.doc2.html, p. 1, Dec. 1997.

"Other Properties," *Java Remote Method Invocation*, http://java.sun.com/products/jdk/1.2/docs/guide/rmi/spec/rmi–properties.doc3.html, p. 1, Dec. 1997.

Kiczales, *Aspect–Oriented Programming*, http://www.parc.xerox.com/spl/projects/aop/invited–talk, 86 pp. 1997.

Mens et al., "Aspect–Oriented Programming Workshop Report," *Proceedings of the Aspect–Oriented Programmin Workshop at ECOOP '97*, 14 pp., 1997.

Aksit, "Issues in Aspect–Oriented Software Development," *Proceedings of the Aspect–Oriented Programming Workshop at ECOOP '97*, 7 pp., 1997.

Czarnecki et al., "Beyond Objects: Generative Programming," *Proceedings of the Aspect–Oriented Programming Workshop at ECOOP '97*, 8 pp., 1997.

De Meuter, "Monads as a Theoretical Foundation for AOP," *Proceedings of the Aspect–Oriented Programming Workshop at ECOOP '97*, 6 pp., 1997.

Dempsey et al., "Aspects of System Support for Distributed Computing," *Proceedings of the Aspect–Oriented Programming Workshop at ECOOP '97*, 6 pp., 1997.

Hernández et al., "Coordinating Concurrent Objects: How to Deal with the Coordination Aspect?, " *Proceedings of the Aspect–Oriented Programming Workshop at ECOOP '97*, 6 pp., 1997.

Holmes et al., "Aspects of Synchronisation," *Proceedings of the Aspect–Oriented Programming Workshop at ECOOP '97*, 6 pp., 1997.

Lamping, "The Interaction of Components and Aspects," *Proceedings of the Aspect–Oriented Programming Workshop at ECOOP '97*, 1 pp., 1997.

Matthijs et al., "Aspects Should Not Die," *Proceedings of the Aspect–Oriented Programming Workshop at ECOOP '97*, 5 pp., 1997.

Müller, "draft: Aspect–Design in the Building–Block Method," *Proceedings of the Aspect–Oriented Programming Workshop at ECOOP '97*, 3 pp., 1997.

Harrison et al., "The Beginnings of a Graphical Environment for Subject–Oriented Programming," *Proceedings of the Aspect–Oriented Programming Workshop at ECOOP '97*, 2 pp., 1997.

Thorup, "Contextural Class Extensions," *Proceedings of the Aspect–Oriented Programming Workshop at ECOOP '97*, 7 pp., 1997.

VanHilst, "Subcomponent Decomposition as a Form of Aspect Oriented Programming," *Proceedings of the Aspect–Oriented Programming Workshop at ECOOP '97*, 2 pp., 1997.

Van Roy et al., "Using Mobility to Make Transparent Distribution Practical," *Proceedings of the Aspect–Oriented Programming Workshop at ECOOP '97*, 18 pp., 1997.

Werner, "Email Thoughts," *Proceedings of the Aspect–Oriented Programming Workshop at ECOOP '97*, 1 pp., 1997.

Aksit et al., "Solving the Modeling Problems of Object–Oriented Languages by Composing Multiple Aspects Using Composition Filters," *Proceedings of the Aspect–Oriented Programming Workshop at ECOOP '98*, 7 pp., 1998.

Bardou, "Roles, Subjects and Aspects: How Do They Relate?," *Proceedings of the Aspect–Oriented Programming Workshop at ECOOP '98*, 7 pp., 1998.

Becker, "$D^2AL$," *Proceedings of the Aspect–Oriented Programming Workshop at ECOOP '98*, 7 pp., 1998.

Berger et al., "Interactions Between Objects: An Aspect of Object–Oriented Languages," *Proceedings of the Aspect–Oriented Programming Workshop at ECOOP '98*, 6 pp., 1998.

Blair et al., "The Impact of Aspect–Oriented Programming on Formal Methods," *Proceedings of the Aspect–Oriented Programming Workshop at ECOOP '98*, 6 pp., 1998.

Blank et al., "Aspects of Enterprise Java Beans," *Proceedings of the Aspect–Oriented Programming Workshop at ECOOP '98*, 4 pp., 1998.

Böllert, "Aspect–Oriented Programming Case Study: System Management Application," *Proceedings of the Aspect–Oriented Programming Workshop at ECOOP '98*, 4 pp., 1998.

Buhr, "A Possible Design Notation for Aspect Oriented Programming," *Proceedings of the Aspect–Oriented Programming Workshop at ECOOP '98*, 11 pp., 1998.

Fabry, "Replication as an Aspect," *Proceedings of the Aspect–Oriented Programming Workshop at ECOOP '98*, 6 pp., 1998.

Fradet et al., "AOP: Towards a Generic Framework Using Program Transormation and Analysis," *Proceedings of the Aspect–Oriented Programming Workshop at ECOOP '98*, 6 pp., 1998.

Hauck et al., "AspectIX: A Middleware for Aspect–Oriented Programming," *Proceedings of the Aspect–Oriented Programming Workshop at ECOOP '98*, 5 pp., 1998.

Holmes, et al., "Towards Reusable Synchronisation for Object–Oriented Languages," *Proceedings of the Aspect–Oriented Programming Workshop at ECOOP '98*, 10 pp., 1998.

Kendall, "Agent Roles and Aspects," *Proceedings of the Aspect–Oriented Programming Workshop at ECOOP '98*, 7 pp., 1998.

Lopes et al., "Recent Developments in AspectJ™," *Proceedings of the Aspect–Oriented Programming Workshop at ECOOP '98*, 4 pp., 1998.

Lorenz et al., "Visitor Beans: An Aspect–Oriented Pattern," *Proceedings of the Aspect–Oriented Programming Workshop at ECOOP '98*, 8 pp., 1998.

Lunau, "Is Composition of Metaobjects=Aspect Oriented Programming," *Proceedings of the Aspect–Oriented Programming Workshop at ECOOP '98*, 4 pp., 1998.

Kenens et al., "An AOP Case with Static and Dynamic Aspects," *Proceedings of the Aspect–Oriented Programming Workshop at ECOOP '98*, 6 pp., 1998.

Nebbe, "Coordination and Composition: The Two Paradigms Underlying AOP?," *Proceedings of the Aspect–Oriented Programming Workshop at ECOOP '98*, 5 pp., 1998.

Ossher et al., "Operation–Level Composition: A Case in (Join) Point," *Proceedings of the Aspect–Oriented Programming Workshop at ECOOP '98*, 4 pp., 1998.

Sánchez et al., "Run–Time Adaptability of Synchronization Policies in Concurrent Object–Oriented Languages," *Proceedings of the Aspect–Oriented Programming Workshop at ECOOP '98*, 10 pp., 1998.

Tekinerdogan et al., "Deriving Design Aspects from Canonical Models," *Proceedings of the Aspect–Oriented Programming Workshop at ECOOP '98,* 7 pp., 1998.
Walker et al., "Assessing Aspect–Oriented Programming and Design: Preliminary Results," *Proceedings of the Aspect–Oriented Programming Workshop at ECOOP '98,* 6 pp., 1998.
Volder, "Aspect–Oriented Logic Meta Programming," *Proceedings of the Aspect–Oriented Programming Workshop at ECOOP '98,* 6 pp., 1998.
Sessions, "Sharing and Scalability," *COM and DCOM,* pp. 249–313, 1998.
Sessions, "Clustering," *COM and DCOM,* pp. 413–442, 1998.
Hamilton (ed.), "Events," *JavaBeans,* Sun Microsystems, pp. 24–39, 1996.
Black, "Scheduling Support for Concurrency and Parallelism in the Mach Operating System," *Computer,* pp. 35–43, May 1990.
King, "The Base System," *Inside Windows 95,* Microsoft Press, pp. 103–150, 1994.
Abadi et al., A Calculus for Access Control in Distributed Systems, Digital Equipment Corporation, pp. 1–44, 1991.
Abadi et al., Baby Modula–3 and a Theory of Objects, Digital Equipment Corporation, pp. 1–36, 1993.
Birrell et al., Synchronization Primitives for a Multiprocessor: A Formal Specification, SRC Research Report 20, pp. 1–20, 1987.
Birrell, An Introduction to Programming with Threads, igital Equipment Corporation, pp. 1–33, 1989.
Burstall et al., A Kernel Language for Modules and Abstract Data Types, Digital Equipment Croporation, pp. 1–51, 1984.
Cardelli, A Polymorphic λ–calculus with Type: Type, Digital Equipment Corporation, pp. 1–27, 1986.
Cardelli et al., *Modula–3 Report (revised),* Digital Equipment Corporation, pp. 1–61, 63, 65–71, and Appendix (Twelve Changes to Modula–3, Dec. 19, 1990, pp. 1–15), 1989.
DeTreville, Experience with Concurrent Garbage Collectors for Modula–2+, Digital Equipment Corporation, pp. 1–58, 1990.
Ellis et al., Real–time Concurrent Collection on Stock Multiprocessors, Digital Equipment Corporation, pp. 1–25, 1988.
Horning et al., Some Useful Modula–3 Interfaces, Digital Equipment Corporation, pp. 1–103, 1993.
Lamport, A Fast Mutual Exclusion Algorithm, Digital Equipment Corporation, pp. 1–12, 1988.
Lamport, A Simple Approach to Specifying Concurrent Systems, Digital Equipment Corporation, pp. 1–39, 1986, 1988.
Lamport, Concurrent Reading and Writing of Clocks, Digital Equipment Corporation, pp. 1–7, 1988.
Lamport, How to Make a Correct Multiprocess Program Execute Correctly on a Multiprocessor, Digital Equipment Corporation, pp. 1–10, 1993.
Lamport, *On Interprocess Communication,* Digital Equipment Corporation, pp. 1–50, 1985.
Lamport, win and sin: Predicate Transformers for Currency, Digital Equipment Corporation, pp. 1–43, 1988.
McJones et al., Evolving the UNIX System Interface to Support Multithreaded Programs, Digital Equipment Corporation, pp. 1–80, 1987.

Nelson, A Generalization of Dijkstra's Calculus, Digital Equipment Corporation, pp. 1–56, 1986.
Owicki, Experience with the Firefly Multiprocessor Workstation, Digital Equipment Corporation pp. 1–15, 17–20, 1989.
Roberts et al., WorkCrews: An Abstraction for Controlling Parallelism, Digital Equipment Corporation, pp. 1–15, 17–19, 1989.
Rovner et al., On extending Modula–2 For Building Large Integrated Systems, Digital Equipment Corporation pp. 1–45, 1985.
Schroeder et al., Performance of Firefly RPC, Digital Equipment Corporation, pp. 1–15, 1989.
Thacker et al., Firefly: A Multiprocessor Workstation, Digital Equipment Corporation pp. 1–13, 15, and 17–18, 1987.
Bruce, "The Treatment of State in Optimistic Systems," *IEEE,* pp. 40–49, Jun. 1995.
"CORBA Overview," The Common Object Request Broker: Architecture and Specification, Revision 2.0, pp. 2–1 through 2–17, Jul. 1995.
The Common Object Request Broker: Architecture and Specification, Revision 2.0, pp. 4–12 through 4–16, Jul. 1995.
Jajodia, "Database Security and Privacy," *The Computer Science and Engineering Handbook,* Tucker (ed.), CRC Press, pp. 1112–1124, 1997.
Sandhu et al., "Authentication, Access Control, and Intrusion Detection," *The Computer Science and Engineering Handbook,* Tucker (ed.), CRC Press, pp. 1929–1948, 1997.
Orfali et al., "Client/Server Transaction Processing," *Essential Client/Server Survival Guide,* pp. 241–288, 1994.
Steinman, "Incremental State Saving in Speedes Using C++," *Proceedings of the 1993 Winter Simulation Conference,* pp. 687–696, 1993.
Limprecht, "Microsoft Transaction Server," *Compcon '97, Proceedings, IEEEE,* pp. 14–18, Feb. 1997.
Franklin, "Concurrency Control and Recovery," *The Computer Science and Engineering Handbook,* Tucker (ed.), CRC Press, pp. 1058–1077, 1997.
Wills "Process Synchronization and Interprocess Communication," *The Computer Science and Engineering Handbook* Tucker (ed.), CRC Press, pp. 1725–1746, 1997.
*Object Transaction Service,* OMG Document 94.6.1, pp. 1–102, 1994.
Chappell, "The Microsoft Transaction Server (MTS): Transactions Meet Components," http://www.microsoft.com/Com./wpaper/mtscomp.asp, pp. 1–17, 1997.
Davis, "Inside IBM's System View," *Datamation,* vol. 37, No. 4, pp. 62–65, Feb. 15, 1991.
Bowen, "Intel's Middleware Move," *InfoWorld,* pp. 1–2, 1998.
Bochenski, *IBM's SystemView,* 1–27, 29–65, 67–79, 81–91, 93–103, 105–115, 117–139, 141–143, 1991.
Broy, Can Fair Choice be Added to Dijkstra's Calculus?, Digital Equipment Corporation, pp. 1–19, 1989.
"The Transport Layer," *Java Remote Method Invocation,* http://java.sun.com/products/jdk/1.2/docs/guide/rmi/spec/rmi–arch.doc5.html, pp. 1–2, Dec. 1997.
"Thread Usage in Remote Method Invocations," *Java Remote Method Invocation,* http://java.sun.com/products/jdk/1.2/docs/guide/rmi/spec/rmi–arch.doc6.html, p. 1, Dec. 1997.

"Garbage Collection of Remote Objects," *Java Remote Method Invocation*, http://java.sun.com/products/jdk/1.2/docs/guide/rmi/spec/rmi–arch.doc7.html, pp. 1–2, Dec. 1997.

"Dynamic Class Loading," *Java Remote Method Invocation*, http://java.sun.com/products/jdk/1.2/docs/guide/rmi/spec/rmi–arch.doc8.html, pp. 1–4, Dec. 1997.

"Security," *Java Remote Method Invocation,* http://java.sun.com/products/jdk/1.2/docs/guide/rmi/spec/rmi–arch.doc9.html, pp. 1–2, Dec. 1997.

"Configuration Scenarios," *Java Remote Method Invocation*, http://java.sun.com/products/jdk/1.2/docs/guide/rmi/spec/rmi–arch.doc10.html, pp. 1–2, Dec. 1997.

"RMI Through Firewalls Via Proxies," *Java Remote Method Invocation*, http://java.sun.com/products/jdk/1.2/docs/guide/rmi/spec/rmi–arch.doc11.html, pp. 1–3, Dec. 1997.

"Client Interfaces," *Java Remote Method Invocation,* http://java.sun.com/products/jdk/1.2/docs/guide/rmi/spec/rmi–client.doc.html, p. 1, Dec. 1997.

"The Remote Interface," *Java Remote Method Invocation,* http://java.sun.com/products/jdk/1.2/docs/guide/rmi/spec/rmi–client.doc1.html, p. 1, Dec. 1997.

"The RemoteException Class," *Java Remote Method Invocation,* http://java.sun.com/products/jdk/1.2/docs/guide/rmi/spec/rmi–client.doc2.html, p. 1, Dec. 1997.

"The Naming Class," *Java Remote Method Invocation,* http://java.sun.com/products/jdk/1.2/docs/guide/rmi/spec/rmi–client.doc3.html, pp. 1–2, Dec. 1997.

"Type Equivalencey of Remote Objects with Local Stub," *Java Remote Method Invocation,* http://java.sun.com/products/jdk/1.2/docs/guide/rmi/spec/rmi–objmodel.doc5.html, p. 1, Dec. 1997.

"Parameter Passing in Remote Method Invocation," *Java Remote Method Invocation,* http://java.sun.com/products/jdk/1.2/docs/guide/rmi/spec/rmi–objmodel.doc6.html, p. 1, Dec. 1997.

"Exception Handling in Remote Method Incovation," *Java Remote Method Invocation,* http://java.sun.com/products/jdk/1.2/docs/guide/rmi/spec/rmi–objmodel.doc7.html, p. 1, Dec. 1997.

"Object Methods Overridden by the RemoteObject Class," *Java Remote Method Invocation,* http://java.sun.com/products/jdk/1.2/docs/guide/rmi/spec/rmi–objmodel.doc8.html, pp. 1–2, Dec. 1997.

"The Semantics of Object Methods Declared Final," *Java Remote Method Invocation,* http://java.sun.com/products/jdk/1.2/docs/guide/rmi/spec/rmi–objmodel.doc9.html, p. 1, Dec. 1997.

"Locating Remote Objects," *Java Remote Method Invocation,* http://java.sun.com/products/jdk/1.2/docs/guide/rmi/spec/rmi–objmodel.doc10.html, p. 1, Dec. 1997.

"System Architecture," *Java Remote Method Invocation,* http://java.sun.com/products/jdk/1.2/docs/guide/rmi/spec/rmi–arch.doc.html, p. 1, Dec. 1997.

"Overview," *Java Remote Method Invocation,* http://java.sun.com/products/jdk/1.2/docs/guide/rmi/spec/rmi–arch.doc1.html, p. 1, Dec. 1997.

"Architectural Overview," *Java Remote Method Invocation,* http://java.sun.com/products/jdk/1.2/docs/guide/rmi/spec/rmi–arch.doc2.html, pp. 1–2, Dec. 1997.

"The Stub/Skeleton Layer," *Java Remote Method Invocation,* http://java.sun.com/products/jdk/1.2/docs/guide/rmi/spec/rmi–arch.doc3.html, p. 1, Dec. 1997.

"The Remote Reference Layer," *Java Remote Method Invocation,* http://java.sun.com/products/jdk/1.2/docs/guide/rmi/spec/rmi–arch.doc4.html, p. 1, Dec. 1997.

Brockschmidt, "Chapter Six, Local/Remote Transparency," *Inside Ole,* 2d Ed., pp. 277–338 (1995).

Go, "Intranet load–balancing solutions: Balance on the back end,"*Infoworld,* pp. 72–86 (Mar. 1998).

Horstmann et al., "DCOM Architecture, " Microsoft Press, pp. 1–55 (Jul. 1997).

Lam, "Building Scalable Apps," *PC Magazine,* pp. 209–214 (Apr. 1998).

Microsoft, *Windows NT. Server,* Server Operating System, White Paper, DCOM Technical Overview, pp. 1–43 (Apr. 1998).

Nance, "Balance the Load with Transaction Server," *BYTE Magazine,* pp. 1–8 (Jun. 1997).

Orfali et al., "COm:OLE's Object Bus, "*The Essential Distributed Objects Survival Guide,* Ch. 25, pp. 425–452 (1996).

Orfali et al., "CORBA Services; System Management and Security," *The Essential Distributed Objects Survival Guid*Ch. 10, pp. 183–202 (1996).

Tomsen, "Virtually Crash–Proof Your Web Site with IIS 4.0," *Microsoft Interactive Developer,* 2:10, pp. 41–46 (Oct. 1997).

Nierstrasz, "Active Objects Hybrid," *Proceedings of OOPSLA*1987, 22:12, pp. 243–253 Oct. 4–8 (Dec. 1987).

Orfali et al., Ch. 9, "RPC, Messaging, and Peer–to–Peer, " *Essential Client/Server Survival Guide,* John WIley & Sons, Inc., pp. 119–128 (1994).

"Chapter 9: Connectable Objects,"pp. 1–12, http://www/microsoft.com/oledev/olecom/Ch09.htm (Jun. 22, 1998).

Hamilton (Ed.),"JavaBeans™" *Sun Microsystems,* Version 1.01, pp. 1–114 (Jul. 1997).

Hurwicz, "Multicast to the Masses: The IP Multicast standard is ready, but the infrastructure isn't. Yet., " *BYTE Magazine,* pp. 1–10 (Jun. 1997).

"Managing Performance/Reliability Trade–Offs," *BYTE Magazine,* Reviews, pp. 1–2 (Feb. 1998).

"Monkey in the Middleware,"*BYTE Magazine,* Reviews, pp. 1–2 (Feb. 1998).

Montgomery, "Distributing Components: For CORBA and DCOM it's time to get practical.," *BYTE Magazine,* Special Report, pp. 1–10 and illustrations "DCOM Architecture" and CORBA Architecture (Apr. 1997).

Skeen, "Enabling the Real–Time Enterprise, " *BYTE Magazine,* Core Technologies, pp. 1–5 and illustrations "Reliable Multicast Protocol in Action" and Multilevel Caching Over a WAN (Jan. 1998).

Neumann, "Security and Privacy Issues in Computer and Communication Systems," Ch. 89, *The Computer Science and Engineering Handbook,* (Tucker, Ed.), pp. 1910–1913 (1997).

Landwehr, Protection (Security) Models and Policy, Ch. 90, *The Computer Science and Engineering Handbook,* Tucker, Ed.), pp. 1914–1928 (1997).

Sandhu et al., "Authentication, Access Control, and Intrusion Detection," Ch. 91, *The Computer Science and Engineering Handbook,* (Tucker, Ed.), pp. 1929–1948 (1997).

Bellovin,"Network and Internet Security," Ch. 92, *The Computer Science and Engineering Handbook,* (Tucker, Ed.), pp. 1949–1961 (1997).

Jajodia, "Database Security and Privacy," Ch. 49, *The Computer Science and Engineering Handbook*, (Tucker, Ed.), pp. 1112–1124 (1997).

McKay, "Microsoft talks up tools" *InfoWorld*, 20:19, 2 pp. (May 11, 1998).

Matena et al., "Enterprise JavaBeans™," Version 1.0 Specification, *Sun Microsystems*, pp. 1–181 (Mar. 1998).

"The Component Object Model: Technical Overview," Microsoft Corporation, pp. 1–17, available at www.microsoft.com/com/wpaper/Com modl.htm (1996).

Seetharaman, "The CORBA Connection," *Communications of the ACM* 41:10, pp. 34–36. (Oct. 1998).

Siegel, "OMG Overview: CORBA and the OMA in Enterprise Computing," *Communications of the ACM*, 41:10, pp. 37–43 (Oct. 1998).

Vinoski, "New Features for CORBA 3.0," *Communications of the ACM*, 41:10, pp. 44–52 (Oct. 1998).

Schmidt, "Evaluation Architectures for Multithreaded Object Request Brokers" *Communications of the ACM*, 41:10, pp. 54–60 (Oct. 1998).

Henning, "Binding, Migration, and Scalability in CORBA," *Communications of the ACM*, 41:10, pp.62–71 (Oct. 1998).

Haggerty et al., "The benefits of CORBA–Based Network Management," *Communications of the ACM*, 41:10, pp. 73–79 (Oct. 1998).

Grimes, "Chapter 7: Security, " *DCOM Programming: A guide to creating practical applications with Microsoft's Distributed Component Object Model*,pp. 319–389 (1997).

Schwartz, "Intel'middleware move: company ponders initiatives for common object services," *InfoWorld*, 20:9, p 1(1), 2 pp. (Mar. 2, 1998).

Barkley, "Role Based Access Control (RBAC)," Software Diagnostics and Conformance Testing National Institute of Standards and Technology, 27 pp. (Mar. 1998).

Gavrila and Barkley, "Formal Specification for Role Based Access Control User/Role and Role/Role Relationship Management," 10 pp. (Oct. 1998).

Barkley, "Application Engineering in Health Care," pp. 1–7 (May 9, 1995).

Cugini and Ferraiolo, "Role Based Access Control Slide Set–May 1995, " National Institute of Standards and Technology, 25 pp. (May 1995).

Smith, Sr. et al., "A Marketing Survey of Civil Federal Government Organizations to Determine the Need for a Role–Based Access Control (RBAC) Security Product," Seta Corporation, 84 pp. (Jul. 1996).

Ferraiolo and Barkley, "Specifying and Managing Role–Based Access Control within a Corporate Intranet," 6 pp. (1997).

Ferraiolo et al., "Role–Based Access Control (RBAC): Features and Motivations," 8 pp. (1995).

Kuhn, "Mutual Exclusion of Roles as a Means of Implementing Separation of Duty in Role–Based Access Control Systems, " 8 pp. (1997).

Barkley, "Comparing Simple Role Based Access Control Models and Access Control Lists," 6 pp. (1997).

Barkley et al., "Role Based Access Control for the World Wide Web," 11 pp. (1997).

Ferraiolo and Kuhn, "Role–Based Access Control," Reprinted from Proceedings of 15 National Computer Security Conference, 11 pp. (1992).

Barkley, "Implementing Role Based Access Control Using Object Technology," (1995).

Ferraiolo, "Role Based Access Control," NIST Web page, http://hissa.ncsl.nist.gov/rbac 2 pp., visited Jun. 1, 1999.

* cited by examiner

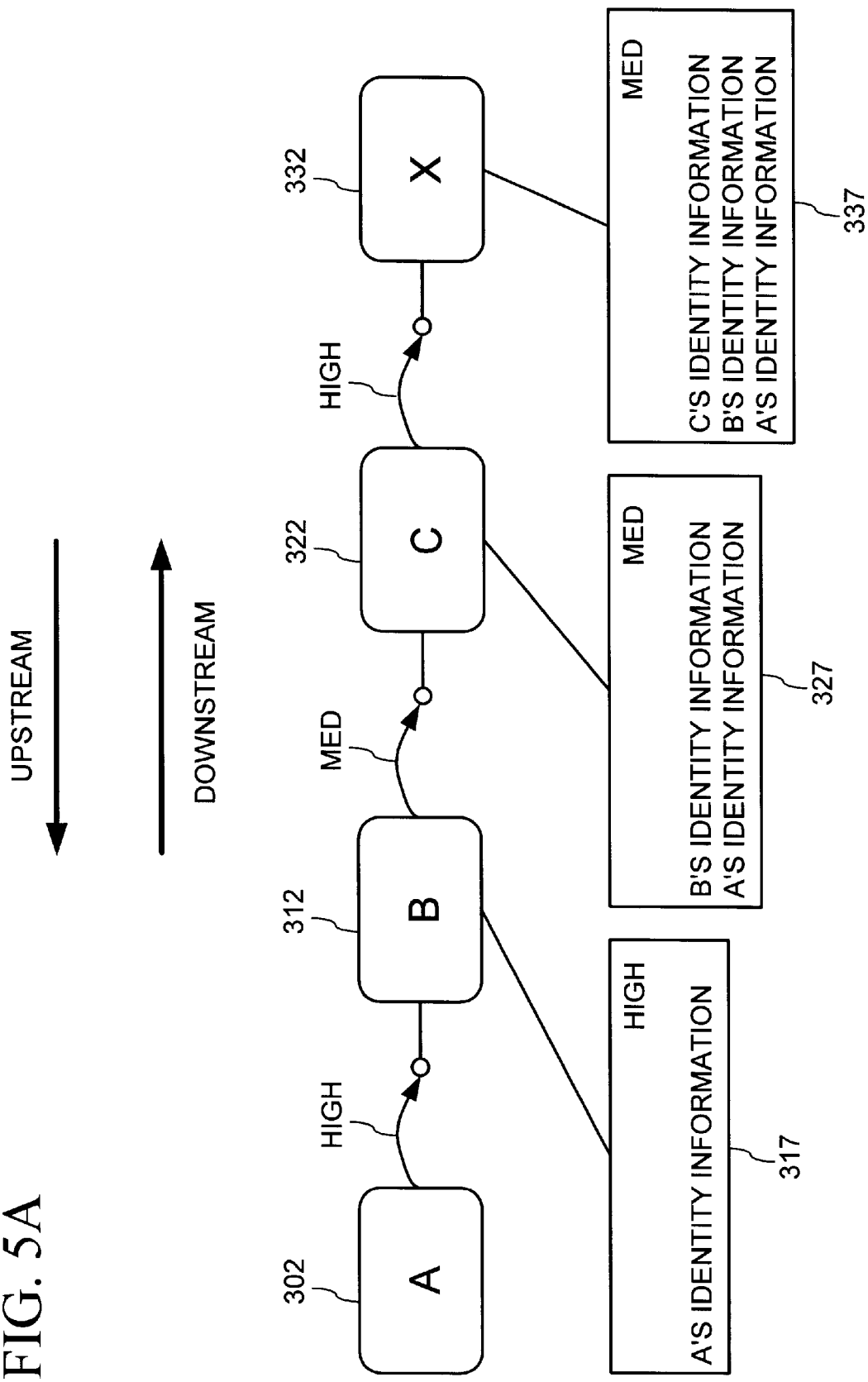

AUTOMATIC OBJECT CALLER CHAIN WITH DECLARATIVE IMPERSONATION AND TRANSITIVE TRUST

TECHNICAL FIELD

The present invention relates to providing security for programming objects, and more particularly relates to an object security service for providing caller identities.

BACKGROUND OF THE INVENTION

In many information processing applications, a server application running on a host or server computer in a distributed network provides processing services or functions for client applications running on terminal or workstation computers of the network which are operated by a multitude of users. Common examples of such server applications include software for processing class registrations at a university, travel reservations, money transfers and other services at a bank, and sales at a retail business. In these examples, the processing services provided by the server application may update databases of class schedules, hotel reservations, account balances, order shipments, payments, or inventory for actions initiated by the individual users at their respective stations.

In a server application that is used by a large number of people, it is often useful to discriminate between what different users and groups of users are able to do with the server application. For example, in an on-line bookstore server application that provides processing services for entering book orders, order cancellations, and book returns, it may serve a useful business purpose to allow any user (e.g., sales clerk or customers) to access book order entry processing services, but only some users to access order cancellation processing services (e.g., a bookstore manager) or book return processing services (e.g., returns department staff).

Network operating systems on which server applications are typically run provide sophisticated security features, such as for controlling which users can logon to use a computer system, or have permission to access particular resources of the computer system (e.g., files, system services, devices, etc.) In the Microsoft Windows NT operating system, for example, each user is assigned a user id, which has an associated password. A system administrator also can assign sets of users to user groups, and designate which users and user groups are permitted access to system objects that represent computer resources, such as files, folders, and devices. During a logon procedure, the user is required to enter the user id along with its associated password to gain access to the computer system. When the user launches a program, the Windows NT operating system associates the user id with the process in which the program is run (along with the process' threads). When a thread executing on the user's behalf then accesses a system resource, the Windows NT operating system performs an authorization check to verify that the user id associated with the thread has permission to access the resource. (See, Custer, *Inside Windows NT* 22, 55–57, 74–81 and 321–326 (Microsoft Press 1993).)

A thread is the basic entity to which the operating system allocates processing time on the computer's central processing unit. A thread can execute any part of an application's code, including a part currently being executed by another thread. All threads of a process share the virtual address space, global variables, and operating-system resources of the process. (See, e.g., Tucker Jr., Allen B. (editor), *The Computer Science and Engineering Handbook* 1662–1665 (CRC Press 1997).)

In object-oriented programming, programs are written as a collection of object classes which each model real world or abstract items by combining data to represent the item's properties with methods (e.g., program functions or procedures) to represent the item's functionality. More specifically, an object is an instance of a programmer-defined type referred to as a class, which exhibits the characteristics of data encapsulation, polymorphism and inheritance.

Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related methods of the object. In other words, the client programs do not access the object's data directly, but must instead call methods on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class.

In object-oriented programming, it is common for a first object to call other objects to perform work on its behalf. These other objects are sometimes referred to as being "downstream" from the first object because the method calls figuratively flow from an upstream object (i.e., the first or caller object) to downstream objects (i.e., the other called objects). The downstream objects may reside at remote locations or run in other processes; therefore, the downstream objects may be associated with identities different from the first object. For example, a typical arrangement is to associate objects executing in certain processes with the system user. Requests for the user identity of calls from these objects will provide the identity "system."

A problem arises when an object executed by a user calls one of the system objects to perform work for it because a call from the system object apparently originates from the system user. Therefore, the security services cannot determine which user actually initiated the original call (e.g., whether it was a manager or a customer).

For example, an application for tracking employee time at a bookstore might create a timekeeping component at startup and associate the timekeeping component with the user "system." The timekeeping component tracks employees' hours by calling other components to write information to a log and other components to edit the log.

Subsequently, when users access the timekeeping component, it is desirable for the identity of the accessing user to be associated with the component, not the system identity. Otherwise, security checks for the writing and editing components cannot differentiate between users to determine if the user is permitted to edit the log (e.g., whether the user is a manager). Also, for auditing purposes, it is desirable to track which user performed what actions. Under the described scenarios, information about the direct caller (i.e., the "system") is not useful. Therefore, a mechanism is needed by which a component can supply an identity other than that associated with its process when making calls to other components.

One attempted solution to this downstream object identity problem is provided by Windows NT, which supports a feature called "impersonation." Using impersonation, a programming component can specify the identity of another, and calls from the component appear to be originating from that user. Additionally, components can specify an impersonation level, indicating whether or not they allow themselves to be impersonated.

However, impersonation under Windows NT requires logic in the component call various security application programming interfaces (or APIs), requiring application developers to become familiar with the APIs and the inner workings of the operating system's security framework. Further, the complexities of the APIs may lead to programming errors when implementing impersonation, resulting in holes in the application's security scheme or other undesired operation. Finally, each developer may use the APIs to develop a different impersonation scheme, making it considerably difficult to combine applications from different developers.

Another attempted solution of the downstream identity problem is provided by an application execution environment called Microsoft Transaction Server, a product separate from Windows NT which provides runtime services to application components.

At runtime, Microsoft Transaction Server monitors execution of the application to provide the identity of an application component's creator and direct caller. Under certain scenarios, however, Microsoft Transaction Server fails to provide relevant information for security checks.

For example, if a first component associated with a user identity (e.g., a manager) invokes a second component created by the system that invokes a third component created by the system, Microsoft Transaction Server will provide the creator (i.e., the system) and the direct caller (i.e., the system) identities of the third component. Thus, Microsoft Transaction Server still fails to provide information helpful in providing accurate identity information for the third component.

SUMMARY OF THE INVENTION

The present invention includes a security framework for objects in which a caller chain is built with logic outside the objects. Since the caller chain is built transparently to the objects, the application developer avoids having to incorporate security logic into application objects. The caller chain is available to security services, which can perform access checks based on information in the chain. The caller chain is further available to the objects for implementing a custom security scheme.

In one aspect of the invention, impersonation can be specified declaratively (i.e., outside the logic of the object) for an object, an interface, or a method. At run time, the security framework automatically invokes impersonation, and an object impersonates its callers. Thus, an object developer can specify that certain objects use the impersonation feature and avoid having to understand the inner workings of the security framework.

In another aspect of the invention, a minimum authentication level is tracked for the caller chain. The minimum authentication level is used to control access to objects, interfaces, and methods.

In still another aspect of the invention, a user can specify a group of objects trusted to provide other objects' identities when the caller chain traverses a method invocation queue.

In yet another aspect of the invention, the caller chain is used in conjunction with roles. Roles are defined at development time and specify logical groups of users independent of actual users. When the application is deployed on a host computer system, the roles are populated with actual users recognized by the host computer system. Access to an object's functionality can be limited to specified roles declaratively through a graphical user interface or programmatically, by including a system call in the object to test for role membership.

Additional features and advantages of the invention will be made apparent from the following detailed description of illustrated embodiments, which proceeds with reference to the accompanying drawings.

BRIEF DESCRIPTION OF THE DRAWINGS

FIG. 5A is a block diagram of a caller chain in which caller information is collected transparently to objects in the chain.

DETAILED DESCRIPTION OF THE INVENTION

The present invention is directed toward a method and system for providing an object execution environment having a security framework with automatic security services. In one embodiment illustrated herein, the invention is incorporated into an object services component entitled "COM+" of an operating system entitled "Microsoft Windows NT Server 5.0," both marketed by Microsoft Corporation of Redmond, Wash. Briefly described, this software is a scaleable, high-performance network and computer operating system supporting distributed client/server computing, and providing an object execution environment for object applications conforming to COM. The COM+ component incorporates object services from prior object systems, including Microsoft Component Object Model (COM), Microsoft Distributed Component Object Model (DCOM), and Microsoft Transaction Server (MTS).

Exemplary Operating Environment

Figure 1:
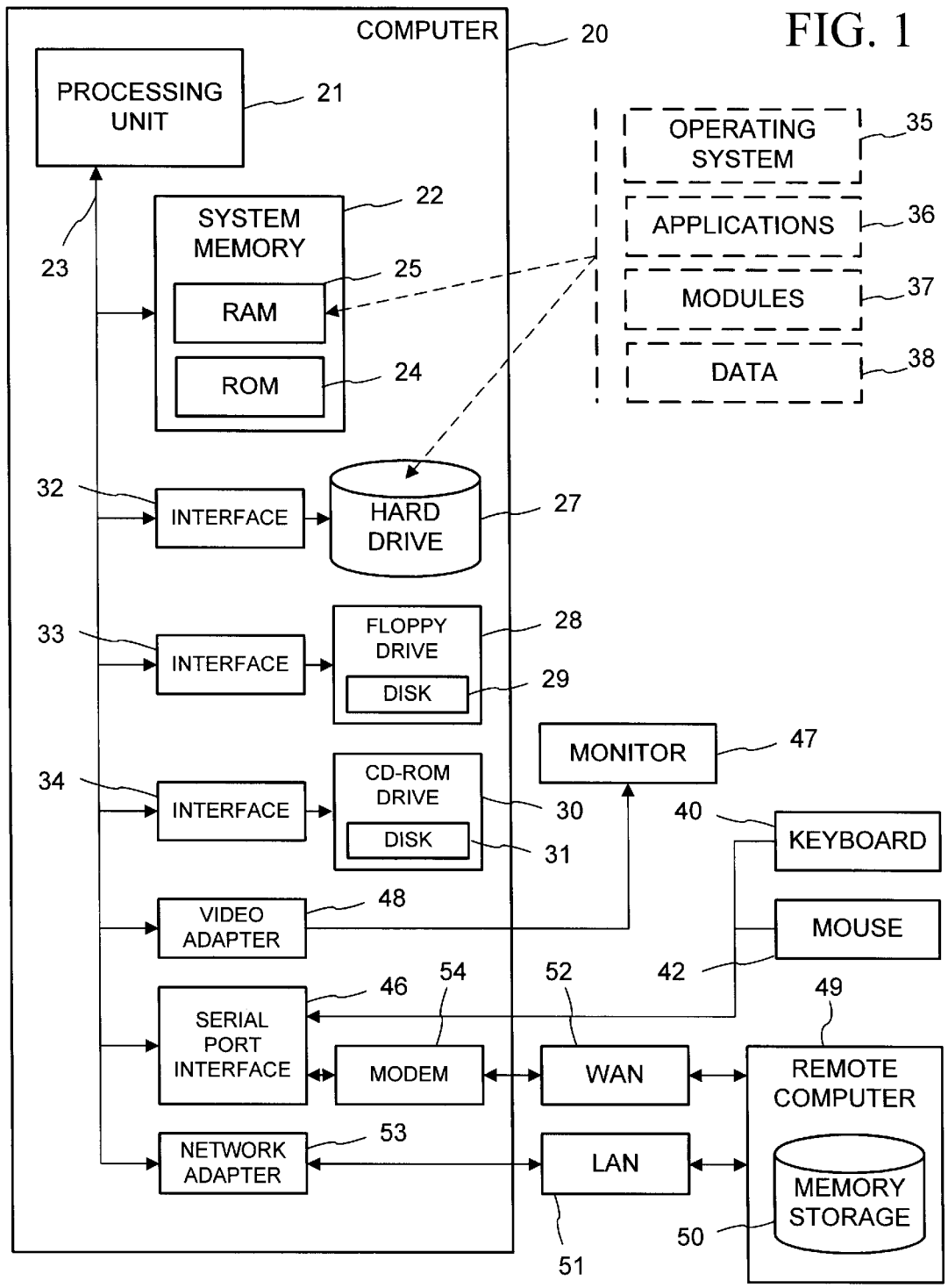
FIG. 1 is a block diagram of a computer system that may be used to implement the described security framework for programming objects.

FIG. 1 and the following discussion are intended to provide a brief, general description of a suitable computing environment in which the invention may be implemented. While the invention will be described in the general context of computer-executable instructions of a computer program that runs on a computer, those skilled in the art will recognize that the invention also may be implemented in combination with other program modules. Generally, program modules include routines, programs, objects (also called components), data structures, etc. that perform particular tasks or implement particular abstract data types. Moreover, those skilled in the art will appreciate that the invention may be practiced with other computer system configurations, including single- or multiprocessor computer systems, minicomputers, mainframe computers, as well as personal computers, hand-held computing devices, microprocessor-based or programmable consumer electronics, and the like. The illustrated embodiment of the invention also is practiced in distributed computing environments where tasks are performed by remote processing devices that are linked through a communications network. But, some embodiments of the invention can be practiced on stand-alone computers. In a distributed computing environment, program modules may be located in both local and remote memory storage devices.

With reference to FIG. 1, an exemplary system for implementing the invention includes a conventional computer 20, including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system (BIOS), containing the basic routines that help to transfer information between elements within the computer 20, such as during start-up, is stored in ROM 24.

The computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. The operating system 35 in the illustrated computer is the Microsoft Windows NT Server operating system, together with the before mentioned Microsoft Transaction Server.

A user may enter commands and information into the computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as a remote client computer 49. The remote computer 49 may be a workstation, a server computer, a router, a peer device or other common network node, and typically includes many or all of the elements described relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54, or is connected to a communications server on the LAN, or has other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Overview of Objects

Figure 2:
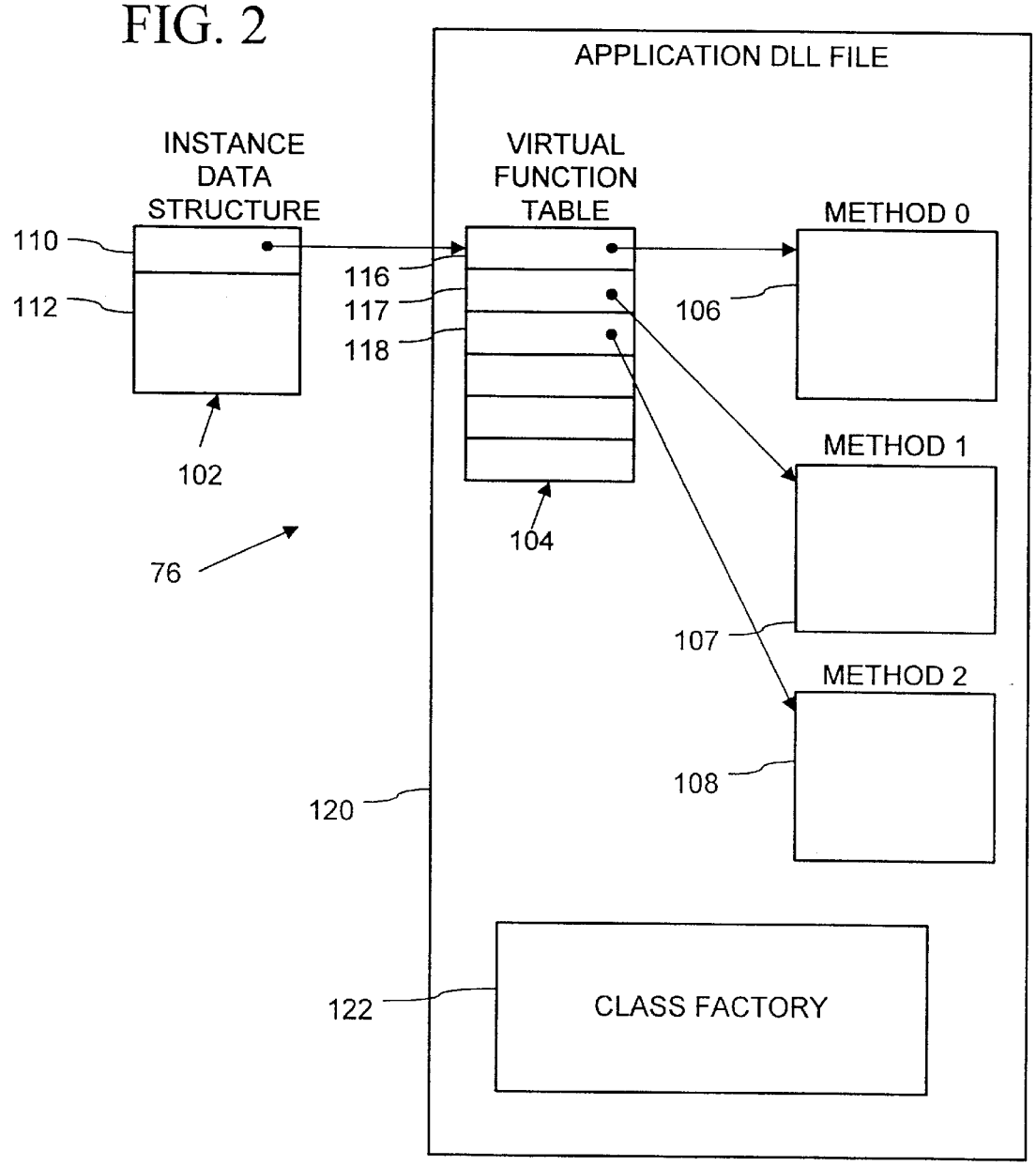
FIG. 2 is a block diagram of an object conforming to the Component Object Model specification of Microsoft Corporation.

FIG. 2 and the following discussion are intended to provide an overview of programming objects, using the Microsoft Component Object Model (COM) as an exemplary object model. In the illustrated embodiments, the security framework is implemented in an extension to the Microsoft COM Environment termed "COM+." COM is a model for accommodating programming objects and can be implemented on a variety of platforms, such as the Microsoft Windows NT operating system. In the illustrated embodiments of the invention, the application objects conform to the Microsoft Component Object Model ("COM") specification (i.e., are implemented as a "COM Object" 72) and are executed using the COM+ services of the Microsoft Windows NT Server 5.0 operating system, but alternatively may be implemented according to other object standards (including the CORBA (Common Object Request Broker Architecture) specification of the Object Management Group, and JavaBeans by Sun Microsystems) and executed under object services of another operating system. The COM specification defines binary standards for objects and their interfaces which facilitate the integration of software objects into applications. (For a detailed discussion of COM and OLE, see Kraig Brockschmidt, *Inside OLE, Second Edition*, Microsoft Press, Redmond, Wash. (1995)).

Application developers build an application by designing a set of application objects (also called "application components") to implement the business logic of the application; each application object contains program code for a portion of the application's work. For example, a banking application may comprise a transfer object, a debit account object, and a credit account object which perform parts of the work of a money transfer operation in the application.

With reference now to FIG. 2, in accordance with COM, the application object 76 is represented in the computer system 20 (FIG. 1) by an instance data structure 102, a virtual function table 104, and member functions 106–108. The instance data structure 102 contains a pointer 110 to the virtual function table 104 and data 112 (also referred to as data members, or properties of the object). A pointer is a data value that holds the address of an item in memory. The virtual function table 104 contains entries 116–118 for the member functions 106–108. Each of the entries 116–118 contains a reference to the code 106–108 that implements the corresponding member function.

The pointer 110, the virtual function table 104, and the member functions 106–108 implement an interface of the application object 76. By convention, the interfaces of a COM object are illustrated graphically as a plug-in jack as shown for the application object 206 in FIG. 3. Also, interfaces conventionally are given names beginning with a capital "I." In accordance with COM, the application object 76 can include multiple interfaces, which are implemented with one or more virtual function tables. The member function of an interface is denoted as "IInterfaceName:: FunctionName."

The virtual function table 104 and member functions 106–108 of the application object 76 are provided by an application program 120 (hereafter "server application DLL") which is stored in the computer on which the object is installed as a dynamic link library file (denoted with a ".dll" file name extension). In accordance with COM, the server application DLL 120 includes code for the virtual function table 104 and member functions 106–108 of the classes that it supports, and also includes a class factory 122 that generates the instance data structure 102 for an object of the class.

Overview of Security Services

In the illustrated embodiments, a security framework provides various security services to objects, relieving application developers from having to incorporate security logic in application objects. The following is a broad overview of the framework's features; an exemplary implementation of the framework is described in more detail in a later section.

Intercepting Calls to Objects with a Wrapper

Figure 3:
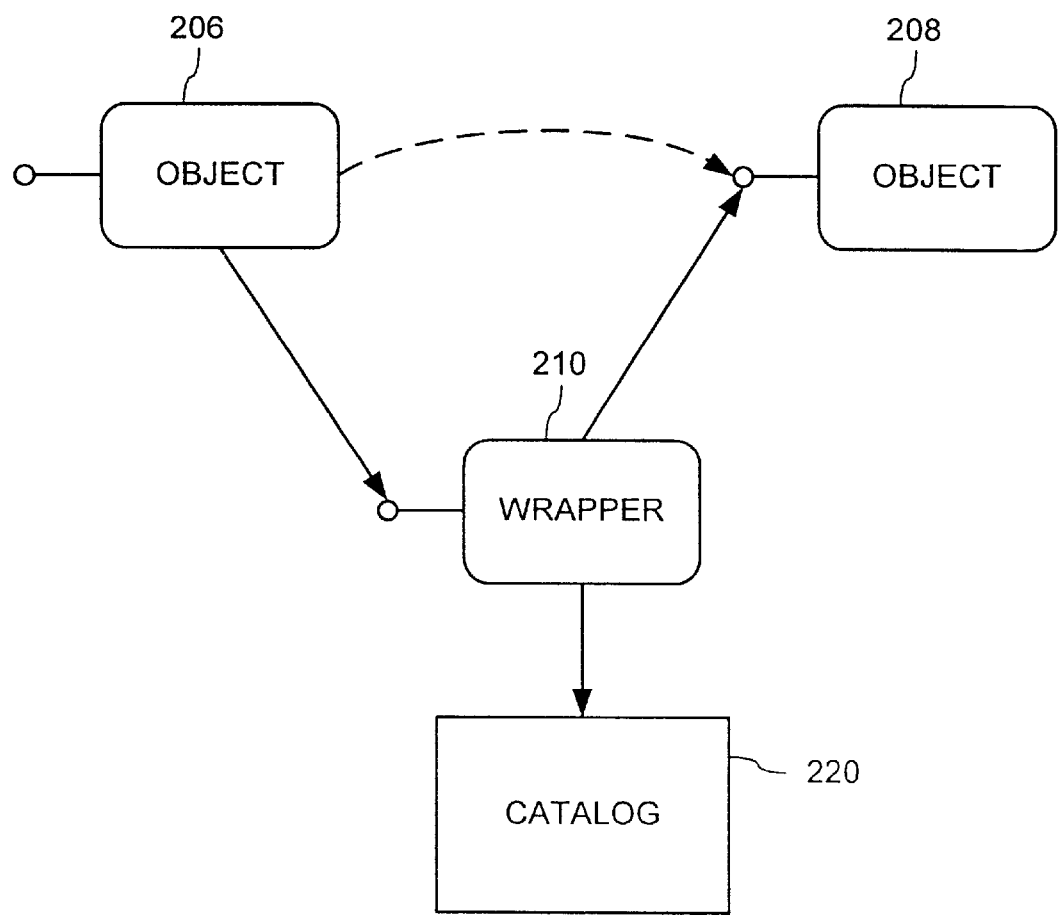
FIG. 3 is a block diagram of a wrapper arrangement for providing security services transparently to a calling and called object.

FIG. 3 shows two objects, 206 and 208. In the illustrated arrangement, the objects are sometimes referred to as a client object 206 and a server object 208, since the object 206 is served by (i.e., accesses functionality of) the object 208. In some cases, the client object 206 might be a calling program other than an object; such a client is sometimes called a "base client." To indicate which user initiated execution of the objects, an identity is associated with calls from the client object 206 (e.g., the identity of a logged on user or an identity indicating the system user) as described in more detail below.

When the client object 206 attempts to access the functionality of the server object 208 it acquires a pointer to an interface of the server object 208 and issues a method call through the interface. As shown in FIG. 3, the security framework interposes a wrapper 210 between the objects, through which calls to the server object 208 pass. The wrapper 210 invokes various security function calls to the operating system (e.g., to determine the identity of a user) and accesses a catalog 220 to determine whether to relay the call to the server object 208, if appropriate. One advantage of the illustrated arrangement is security settings can be changed by modifying the catalog 220 without modifying or recompiling the objects. Also, the security framework can be modified to incorporate new technologies or improvements without having to modify the objects. Finally, developers of the business logic of the objects can avoid becoming familiar with abstruse security logic, speeding and simplifying application development.

The wrapper 210 can be interposed between the objects in a variety of ways (e.g., by an object creation service when the server object 208 is instantiated, or by unmarshaling code when a reference to the object 208 is unmarshaled), as described in more detail below. Also, the catalog 220 can be created in a variety of ways, such as by a graphical user interface or with reference to declarations in source code. The result of the arrangement shown in FIG. 3 is objects execute without regard to the design of the security framework; in other words, the security framework is transparent to the objects.

Figure 4:
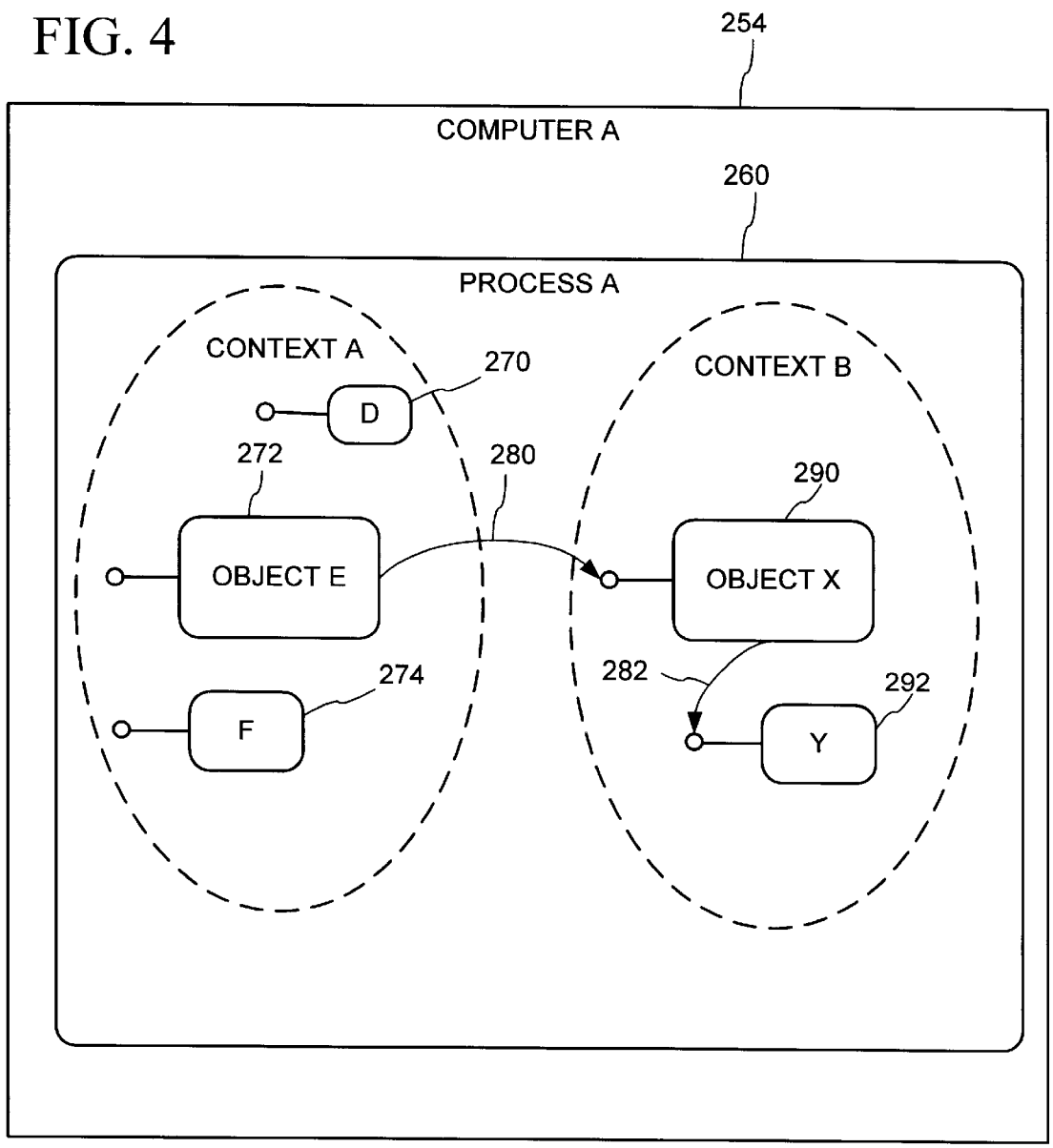
FIG. 4 is a block diagram of a security scheme in which objects of different applications are placed in different object contexts.

An exemplary use of the security framework to achieve security boundaries is shown in FIG. 4, wherein objects are shown as residing in object contexts. Object contexts are an environment extensibility mechanism described at length in Thatte et al., "Environment Extensibility and Automatic Services For Component Applications Using Contexts, Policies And Activators," U.S. patent application Ser. No. 09/135,397, filed Aug. 17, 1998, the disclosure of which is incorporated herein by reference.

In summary, an object context is defined by its object context properties (e.g., a machine property, a process property, and an application property). If an object is in an object context having different object context properties from another object, the objects are said to be in different object contexts. A wrapper is automatically placed between references to objects residing in different object contexts when a cross-context reference is unmarshaled; the wrapper is provided with references to various policies as described below. The policies perform logic to establish an environment appropriate for the object context in light of the cross-context call.

In the example, objects are associated with an application via a unique identifier associated with the application. An application identifier is incorporated into the object's object context as one of the object context properties. Application identifiers can identify an application (e.g., a banking application) or various system services. Accordingly, objects in different applications are placed into different object contexts and a wrapper is interposed between them. Associated policies perform logic (e.g., security checking) appropriate for a cross-application call.

With reference now to FIG. 4, various objects execute in a process 260 on a computer 254. The objects 270, 272, and 274 are members of one application and are accordingly placed in object context A; the objects 290 and 292 are members of another application and accordingly are placed in object context B. When an object in one application attempts to access the functionality of an object in the other application, a wrapper is automatically interposed between the object (e.g., the call 280 is directed to a wrapper; the call 282 is not). The wrapper is provided with a reference to a security policy, which performs the various functions described below, such as providing a caller chain and enforcing a security boundary. The wrapper can be implemented between objects on the same computer in the same process, across computers, and across processes.

Although the example in FIG. 4 incorporates an object's application identifier as one of the object context properties to place objects in an appropriate object context, the framework supports other arrangements. For example, a developer identifier could be used. Information indicating the objects' object context properties is acquired from a central database of object properties (e.g., a registry or catalog) and at run time (e.g., by determining on which computer an object resides).

Providing a Caller Chain

With reference now to FIG. 5A, an exemplary arrangement for providing a caller chain is shown with a base client 302 and objects 312, 322, and 332. Calls between the objects are intercepted and forwarded by a wrapper, as shown in FIG. 3. The base client 302 and the objects 312 and 322 are associated with a user identity (i.e., A, B, or C), and the communication channel between each object has an associated authentication level (i.e., "low," "medium," or "high"). The callers of the object 332 are also sometimes called the "upstream" callers of the object 332.

The wrapper arrangement invokes system calls to collect information about an object's direct caller (i.e., the caller most recently added to the chain) and builds a caller chain by adding the direct caller information to the caller chain built by upstream callers, if any. The arrangement also tracks the lowest authentication level in the chain. For example, after the object 302 calls the object 312, the caller chain 317 available to the object 312 indicates that the caller is A and the lowest authentication level is "high." When the object 312 calls the object 322, the caller chain 327 available to the object 322 indicates the callers are B and A and the lowest authentication level is "medium." Finally, when the object 322 calls the object 332, the caller chain 337 indicates the upstream callers are C, B, and A, and the lowest authentication level is "medium." The ordered list of callers is provided so access checks can be made (e.g., by a wrapper) before allowing access to the object 332, thereby providing security services transparently to the object 332. In this way, security is provided to the objects, but developers avoid including certain security logic (e.g., logic for building the caller chain) in the objects. Further, the caller chain is made available for examination by the object 332, so a developer can include code in the object 332 to implement a custom security scheme if desired.

Figure 5B:
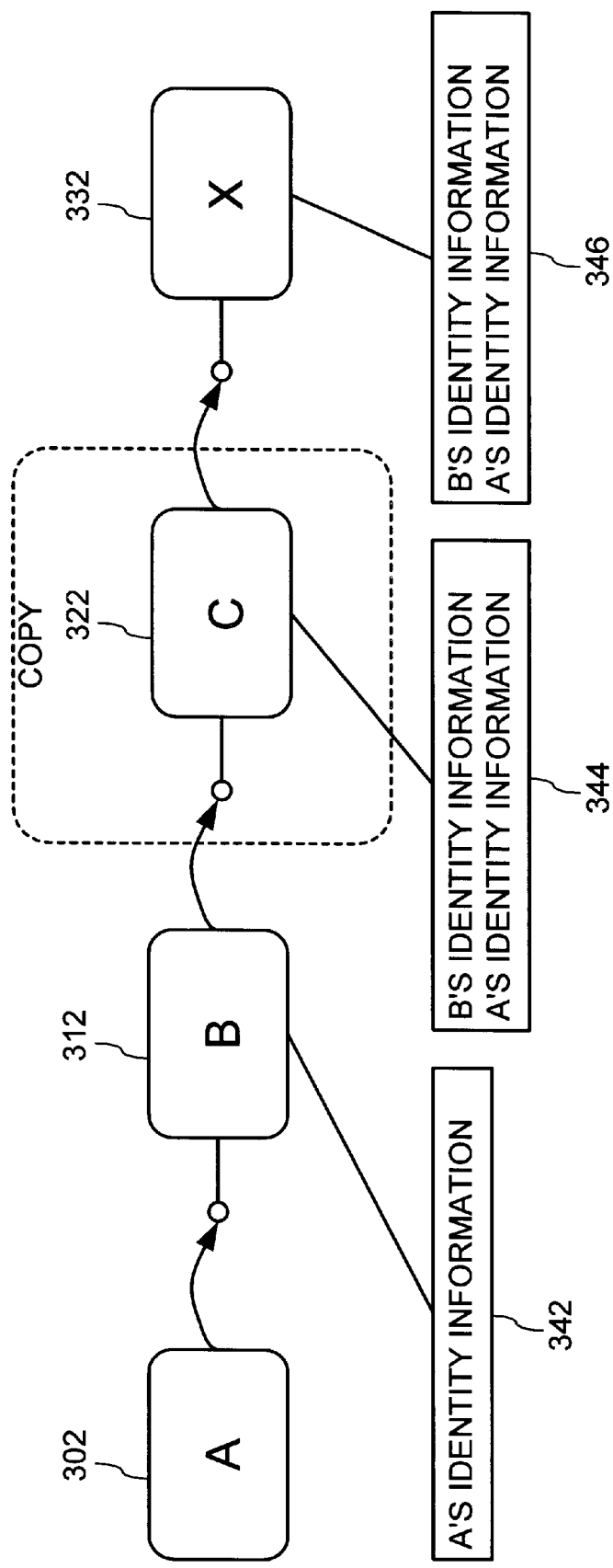
FIG. 5B is a block diagram of a caller chain implementing a security context transfer style of copy.

With reference now to FIG. 5B, the object 322 specifies a caller chain transfer style of "copy." Accordingly, when the security chain 346 is built, the caller chain information 344 is used as the chain information 346 for the object 332. The identity information associated with the object 322 (i.e., "C") is not included in the caller chain 346. Additionally, a minimum authentication level can be tracked (not shown). The information in the caller chain may not actually be copied because the security framework can use pointers and caching to avoid copying information under certain circumstances.

Figure 6:
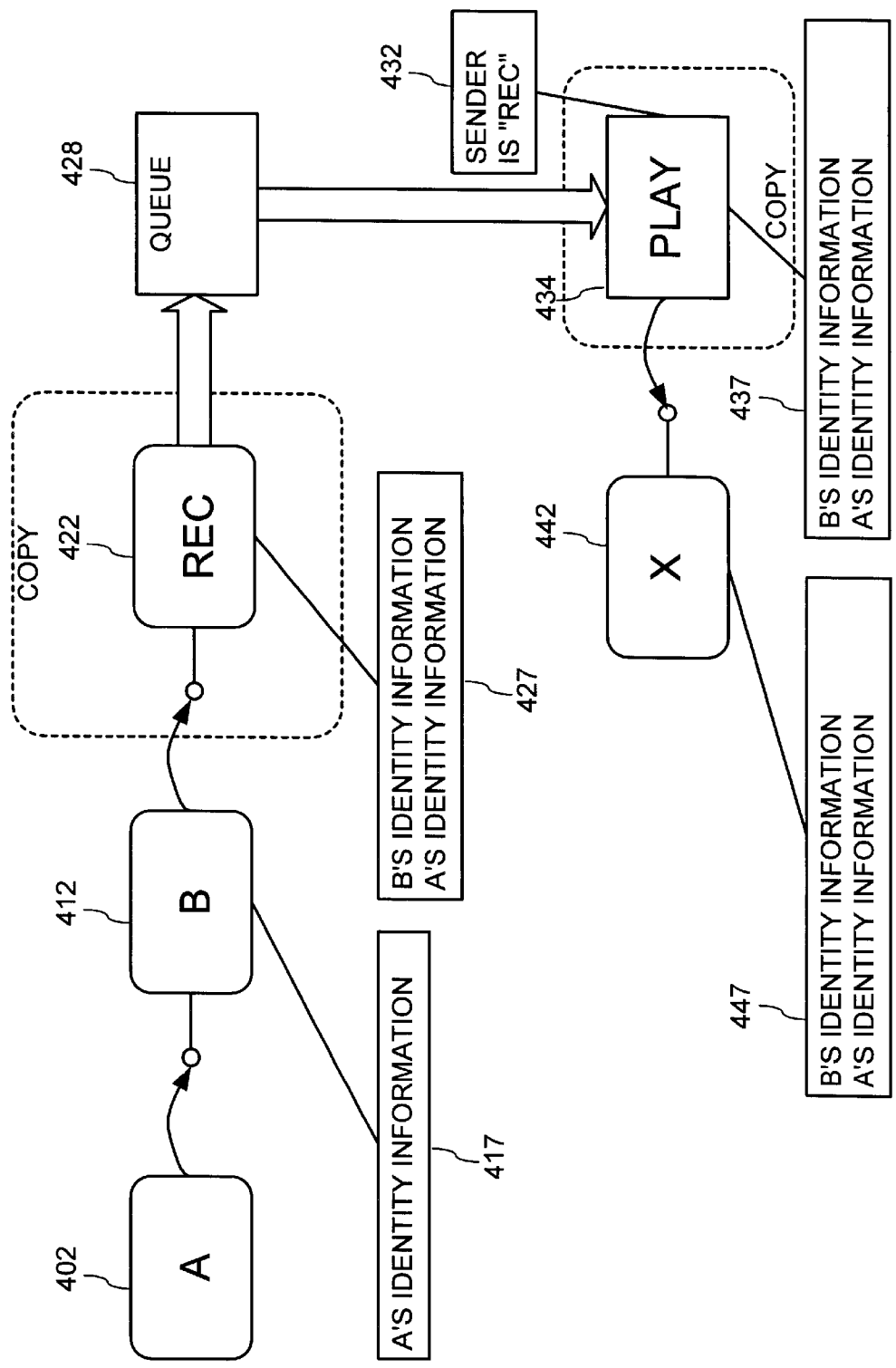
FIG. 6 is a block diagram of a caller chain traversing a method invocation queue.

A caller chain traversing a method invocation queue is shown in FIG. 6. One way of implementing a method invocation queue is using "queued" components, which are described at length in Dievendorff et al., "Queued Method Invocations on Distributed Component Applications," U.S. patent application Ser. No. 09/135,378, filed Sep. 2, 1998, which is incorporated herein by reference. A base client 402 calls an object 412, which in turn calls a recorder component 422. The wrapper arrangement automatically builds caller chains 417 and 427. The recorder specifies a caller chain transfer style of "copy" and sends the call and the caller chain 427 to a queue 428, which is eventually read by a player component 434. Upon receiving the call from the queue, the player component 434 reconstructs the caller chain 437 (from the caller chain 427) and additionally has information 432 about the object that sent the call to the queue 428.

The player component 434 then specifies a caller chain transfer style of "copy" and sends the call to the object 442; the caller chain 447 appears as it would have, had the recorder 422 and the player 434 not been involved in the call. Accordingly, access checks (e.g., determining whether the caller is in a permitted role) can be made using the security chain 447 to determine whether to allow the call to the object 447. In other words, the call is queued transparently to the called object 442, and a method invocation queue can be used while still respecting the security scheme specified by a developer.

Exemplary Implementation of the Security Framework

An example of an implementation of the security framework in the Windows NT operating system follows. The framework accesses various security services of the Windows NT operating system to implement a security scheme. For a more detailed description of the Windows NT security services, see Richard Grimes, "Professional DCOM Programming," pages 319–389 (Chapter 7, Security) 1997.

Windows NT Security Services

In summary, Windows NT identifies users and groups with unique identifiers called security IDs (SIDs). A collection of SIDs for the identity of a user, the groups to which the user belongs, and other related information, such as an impersonation level, is assembled into a single structure called a token.

A token is kept as part of a process's information to indicate the user initiating the process. By default, calls originating from the process are identified by the operating system as associated with the process's token. Alternatively, an identity can be kept as part of a thread's information (e.g., to facilitate impersonation of a remote user). For example, the thread on which the client object 206 (FIG. 3) is executing may be associated with a token. If so, calls on the thread are identified by the operating system as associated with the thread's token.

A network connection between two machines (e.g., over a LAN or the Internet) can provide a certain degree of confidence about identities reported over the connection. Whenever a caller's identity is provided over a network connection, the degree of certainty about the caller's identity is represented as a particular authentication level. When the authentication service creates a token, the authentication level information is not placed into the token, but the authentication level used for a particular call is available from COM APIs.

Authentication levels supported by Windows NT include none, connect level authentication, call level authentication, packet level authentication, packet integrity level authentication and encrypted packet authentication. A low authentication level (e.g., none), indicates no steps have been taken to authenticate the user's identity. At the authentication level "none," the user's identity is not available to the server. A higher authentication level (e.g., per-packet), indicates that some steps (i.e., each packet has been authenticated) have been taken to authenticate the user's identity. For example, the connect level indicates the user's identity was authenticated when the connection is first made (e.g., using a challenge/response scheme). The following table illustrates various authentication levels defined for Windows NT:

TABLE 1

| Name | Description |
| --- | --- |
| RPC_C_AUTHN_LEVEL_NONE | No authentication. |
| RPC_C_AUTHN_LEVEL_CONNECT | Authentication occurs when a connection is made to the server. Connectionless protocols do not use this, see _PKT, below. |

TABLE 1-continued

| Name | Description |
| --- | --- |
| RPC_C_AUTHN_LEVEL_CALL | The authentication occurs when a RPC call is accepted by the server. Connectionless protocols do not use this, this, see _PKT below. |
| RPC_C_AUTHN_LEVEL_PKT | Authenticates the data on a per-packet basis, all data is authenticated. |
| RPC_C_AUTHN_LEVEL_PKT_INTEGRITY | This authenticates that the data has come from the client, and it checks that the data has not been modified. |
| RPC_C_AUTHN_LEVEL_PKT_PRIVACY | In addition to the checks made by the other authentication techniques, this encrypts the packet. |

In the illustrated security framework, the identity of a user as reported by the system is associated with the Windows NT authentication level used to authenticate the identity. In this way, both the reported identity and confidence in the reported identity can be evaluated when performing security checks.

Windows NT supports a feature called impersonation, by which a calling program can take on the identity of another user (i.e., a user other than the user which created the process in which the calling program resides). In a typical arrangement, a server object impersonates a client program to access various resources on behalf of the client. Impersonation is achieved in Windows NT by accessing various security APIs, such as CoImpersonateClient( ) and CoRevertToSelf( ).

In addition, a client program can specify an impersonation level to control whether its identity can be impersonated. The following are exemplary impersonation levels defined in Windows NT:

TABLE 2

| Name | Description |
| --- | --- |
| RPC_C_IMP_LEVEL_ANONYMOUS | The client is anonymous, and the server cannot determine the client's identity. |
| RPC_C_IMP_LEVEL_IDENTIFY | The sever can impersonate the client to check permissions in an Access Control List, but cannot access system objects. This is typically the default value. |
| RPC_C_IMP_LEVEL_IMPERSONATE | The server can impersonate the client, and access system objects on the client's behalf. |
| RPC_C_IMP_LEVEL_DELEGATE | In addition to the_IMPERSONATE level, this level can impersonate the client on calls to other servers. |

A client specifies its security settings by placing values into a structure (i.e., COAUTHINFO) and calling the appropriate API, such as CoInitializeSecurity( ) or CoGetClassObject( ). Calls from the client to servers are then associated with the specified settings. Under the illustrated security framework, a Windows NT impersonation level specified by the client is respected.

COM+ Explorer

Application developers and deployers can use the illustrated security framework to specify a security scheme in a COM+ environment. For example, a developer can specify automatic impersonation for calls to a particular method. One way a developer can specify the security features for a set of COM objects is by using the COM+ Explorer.

The COM+ Explorer is illustrated as an enhanced version of the Object Explorer provided in the Microsoft Transaction Server, marketed by Microsoft Corporation of Redmond, Washington. The COM+ Explorer supports the roles feature of Microsoft Transaction Server. Roles are logical classes of users (e.g., a "managers" role and a "tellers" role) independent of actual users and groups recognized by a host computer system. When the application is deployed on a host computer, the roles are bound to actual users or groups of users at the host computer (e.g., the "managers" role binds to the group called "group4" and a user called "user2" at deployment time).

The various settings selected with the COM+ Object Explorer are kept in a central store called the catalog. Subsequently, when a developer wishes to prepare a particular application for distribution, the developer selects an export option, which allows the developer to export either a client version (to be run remotely from a server) or a server version (to accommodate remote client versions) of the application. These versions are also sometimes called "packages." The export option generates a catalog appropriate for the package; at deployment time, the catalog is imported into the computer onto which the package is deployed.

Figure 7:
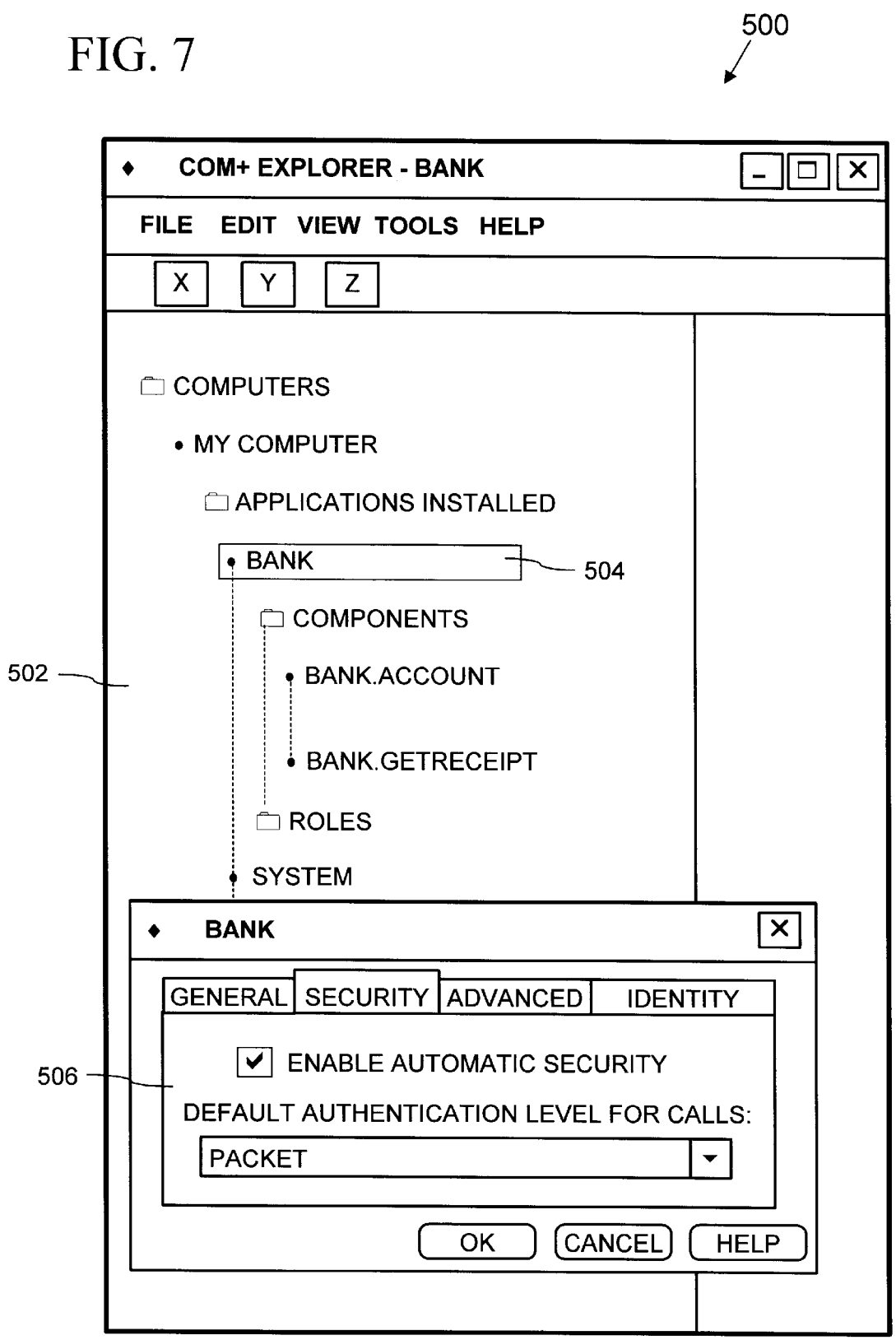
FIG. 7 is a view of a graphical user interface of an administration utility called the COM+ Object Explorer, for declaring various security requirements for objects.

The COM+ Object Explorer also supports declarative security settings for particular applications, objects, interfaces, and methods. A screen shot of the COM+ Object Explorer is shown in FIG. 7. A user (e.g., an application developer) is presented with a window 500 with a pane 502 showing a highlighted label 504 for the application "bank." The window 506 allows the user to enable automatic security by checking the appropriate checkbox.

For example, selecting the automatic security checkbox as shown in FIG. 7 results in a catalog entry indicating automatic security for the component. Subsequently, when an instance of the component is instantiated, the activation service consults the catalog and places a security activator in the activation chain based on the automatic security setting; activators are described in more detail below. The user can also set an authentication level (e.g., "packet") for the application using a pick list. If a call is attempted to objects in the application and the call is associated with an authentication level lower than the specified authentication level, the call is rejected. Authentication levels are described in more detail below.

Figure 8:
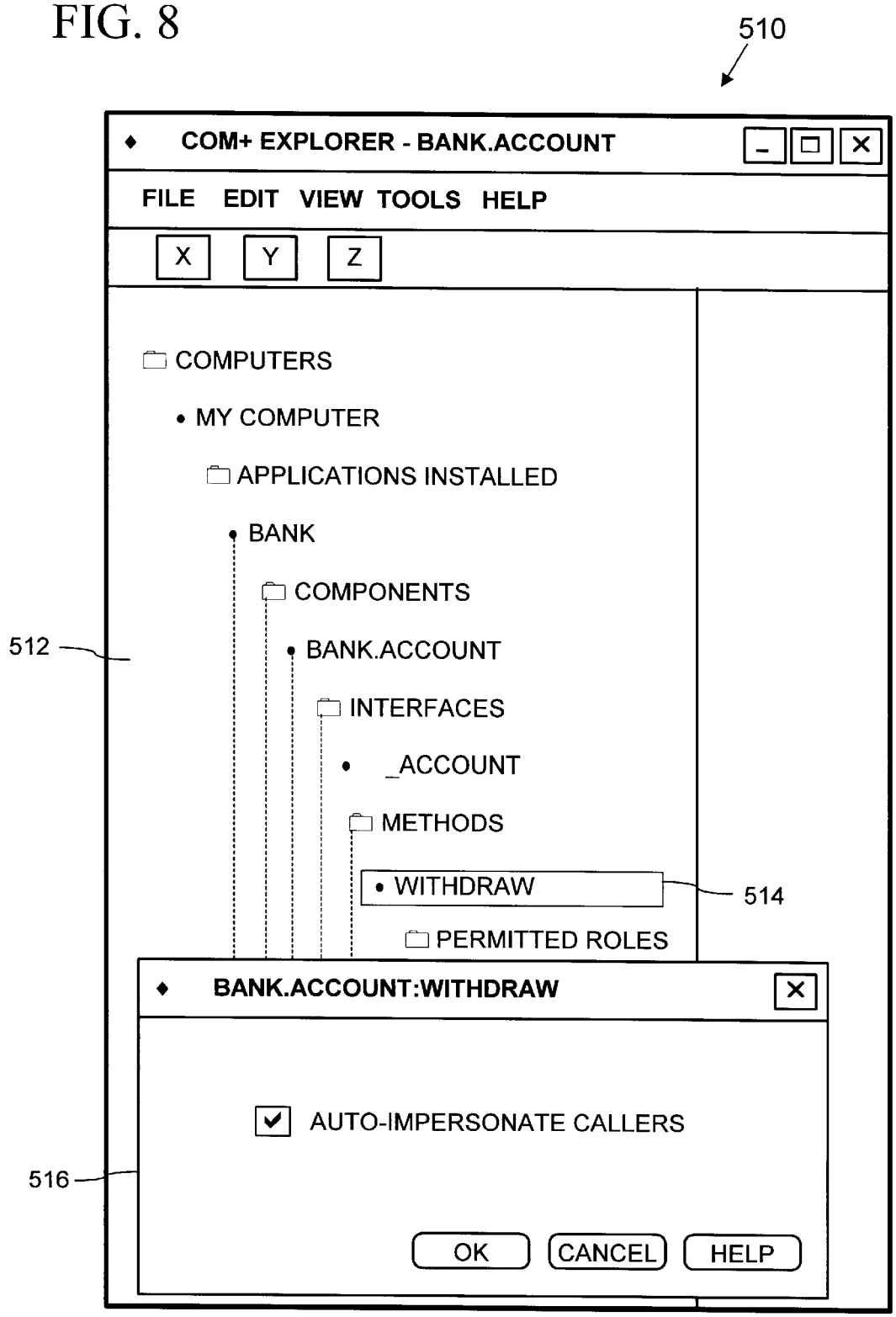
FIG. 8 is a view of a feature of the COM+ Object Explorer interface for controlling impersonation for applications, objects, interfaces, and methods.

With reference now to FIG. 8, a window 510 shows a declarative security setting for a particular method in the bank application for an object called "account." The label 514 is highlighted in the pane 512 to show the "withdraw" method of the "account" object is selected. The window 516 allows the user to specify that the method should auto-impersonate callers. If an application, object, interface or method with the auto-impersonate option is called, calls by the called object appear to originate from the caller. An entry is made in the catalog to reflect the option, as described in more detail below and shown in FIG. 11A.

Figure 9:
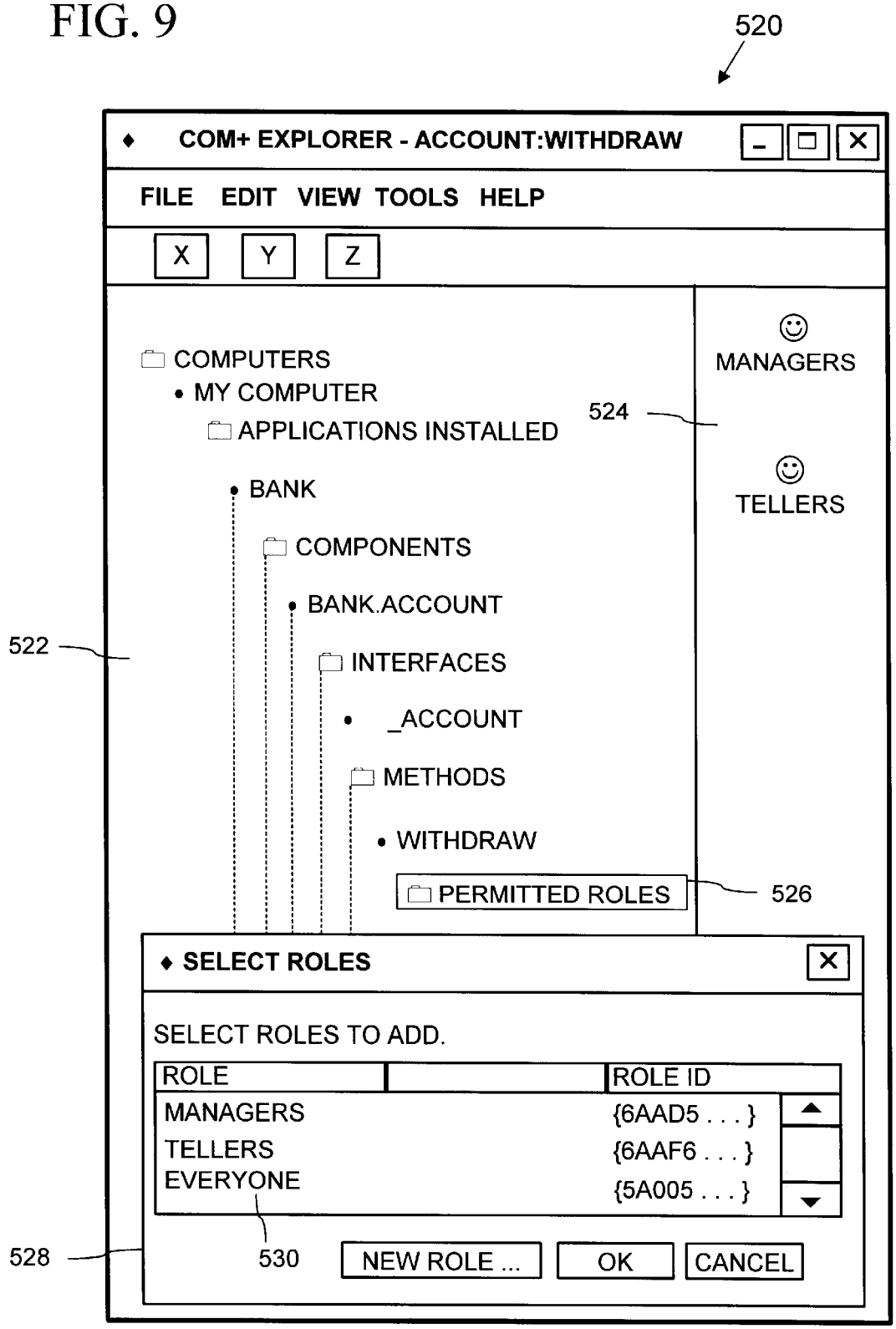
FIG. 9 is a view of a feature of the COM+ Object Explorer interface for limiting access to a particular method to specified particular roles.

The window 520 of FIG. 9 shows a user (e.g., an application developer) choosing which roles have access to a particular method of an interface to the object "account." In the pane 522, the "permitted roles" label 526 for the method "withdraw" is highlighted, indicating the various roles permitted to call the method are shown in the pane 524. Currently, the roles "managers" and "tellers" have access to the method. The window 528 shows the various roles 530 from which the user can select to add to the permitted roles. Although the example shows controlling access at the method level, a user can also control access at the application, object, and interface level by selecting an appropriate line in the pane 522.

An alternative way to declaratively define security in the framework is to put various declaration lines in the object's source code. The declarations are scanned at compile time to assemble access control settings instead of or in addition to using the COM+ Object Explorer. Subsequent changes can be made and rescanned without having to recompile the objects. An example of such declaration lines follows:

TABLE 3

[ RoleAccess = "managers,tellers" ]
Interface IsecureFunctions
{
    [ RoleAccess = "managers" ]
        double SetBalance
            ([in] long lAccount, [in] double dAmount);
//no RoleAccess attribute implies no method-level check
        double GetBalance
            ([in] long lAccount, [out] double *pdAmount);
}
[ RoleAccess = "manager, tellers, temps" ]
coclass Bank : public ISecureFunctions, IOpenFunctions
{
    public:
        //business logic function declarations
}

Figure 10:
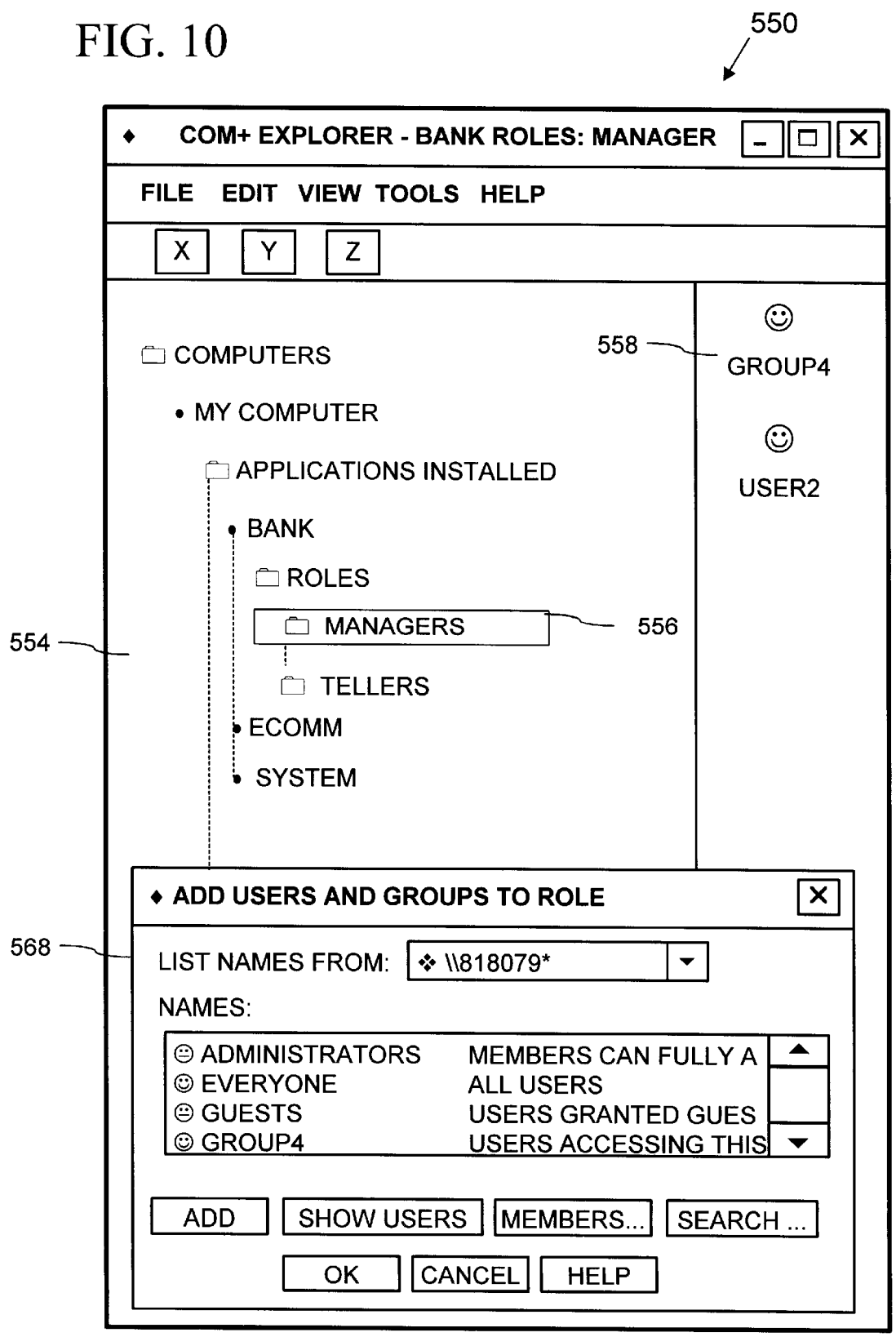
FIG. 10 is a view of a feature of the COM+ Object Explorer interface for adding users and groups to a role when an application is deployed on a host system.

When the application is deployed, the deploying user is presented with an interface as shown in FIG. 10. The window 550 includes a pane 554, which has a highlighted line for the managers role 556, indicating the pane 558 shows the current users and groups (i.e., group4 and user2) to be bound to the role "managers." The deploying user can add various users and groups to the role by selecting from those shown in the window 568. When the deploying user has completed selecting various groups and users for the roles, the roles are bound to the selected groups and users by storing role information in the catalog, as shown in more detail below. The various role settings can be modified after deployment by a user such as a system administrator with an appropriate password.

Figure 11:
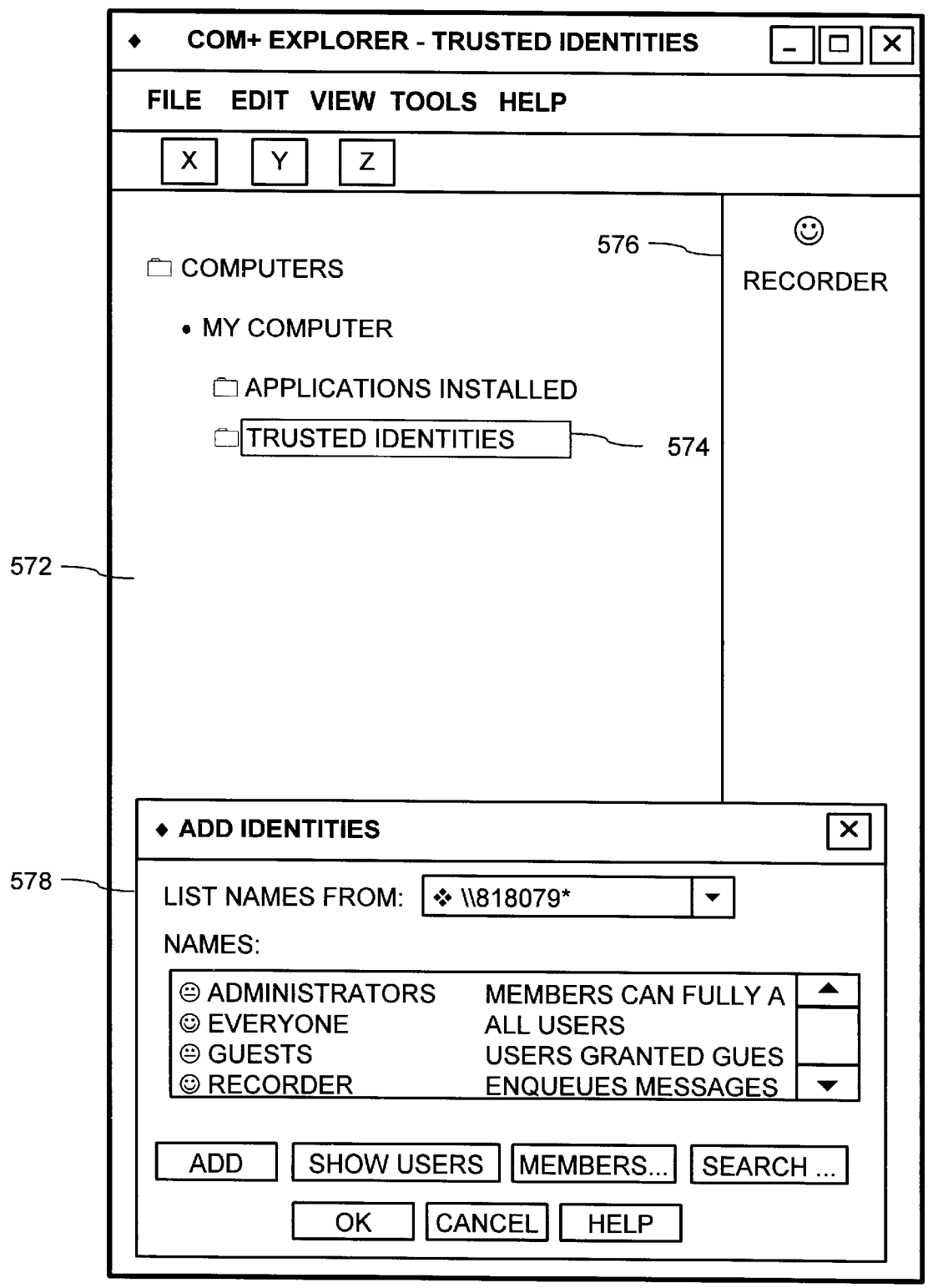
FIG. 11 is a view of a feature of the COM+ Object Explorer interface for specifying trusted identities when constructing the caller chain across a method invocation queue.

Additionally, an optional feature allows the user to specify a list of trusted identities, as shown in FIG. 11. In the window 570, a pane 572 shows the "trusted identities" label 574 is highlighted, indicating the trusted identities (i.e., the recorder) are shown in the pane 576. The user employs the window 578 to add other trusted identities to the list, which is stored in the catalog.

The trusted identities are those identities allowed to specify identities other than their own across various security boundaries. The practice of allowing an identity to specify another's identity is sometimes called "transitive trust." In the illustrated embodiment, the trusted identities are permitted to specify others' identities across a method invocation queue. An alternative to using identity to implement transitive trust is to specify a list of trusted processes. Such an arrangement is useful if for some reason the identity cannot be reliably relayed across a boundary.

Figure 12A:
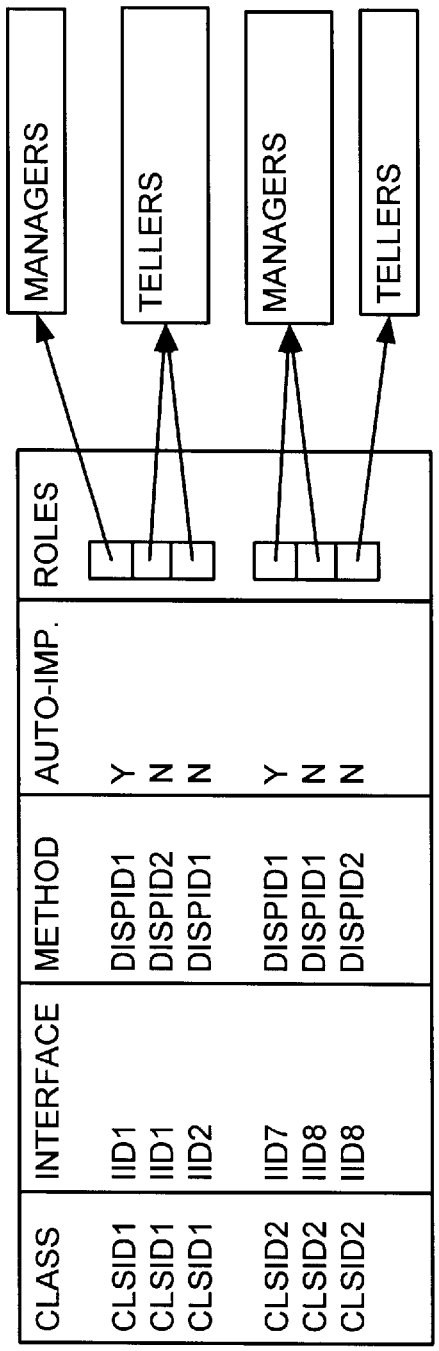
FIG. 12A is a block diagram showing a portion of a store called a catalog showing security-related information.

The catalog stores a wide variety of information related to an application, including the security settings. FIG. 12A shows a security-related portion of the catalog. The catalog organizes various security settings by class, interface, and method and indicates whether auto-impersonation was selected for an application, object, interface or method.

Objects are denoted by their class identifier (CLSID), a globally unique identifier (GUID) identifying the object's class. An interface identifier (IID) identifies the interface, and a dispatch identifier (DISPID) identifies the method. Methods are commonly assigned a particular DISPID according to the position (e.g., 2) the method has in the interface declaration. Additionally, the catalog contains a flag indicating whether automatic impersonation was selected and the permitted roles for the various methods.

Figure 12B:
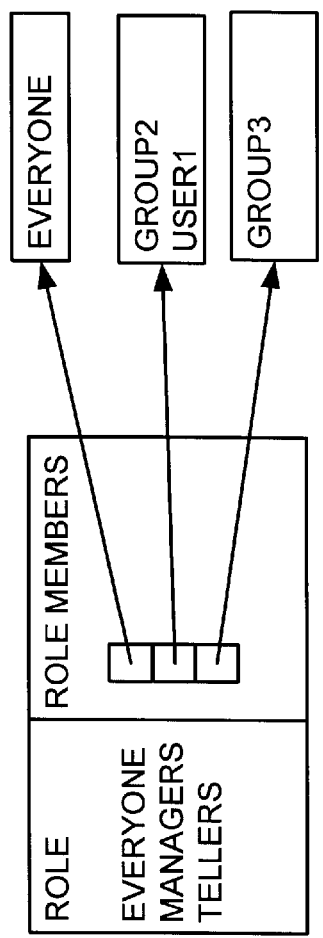
FIG. 12B is a block diagram showing a portion of the catalog defining role membership for a deployed application.

FIG. 12B shows another portion of the catalog indicating which users and groups are bound to which roles. The users and groups are represented by the security identifiers (SIDs) in the catalog. In the example shown, the "managers" role has a membership of "group2" and the user "user1."

Figure 12C:
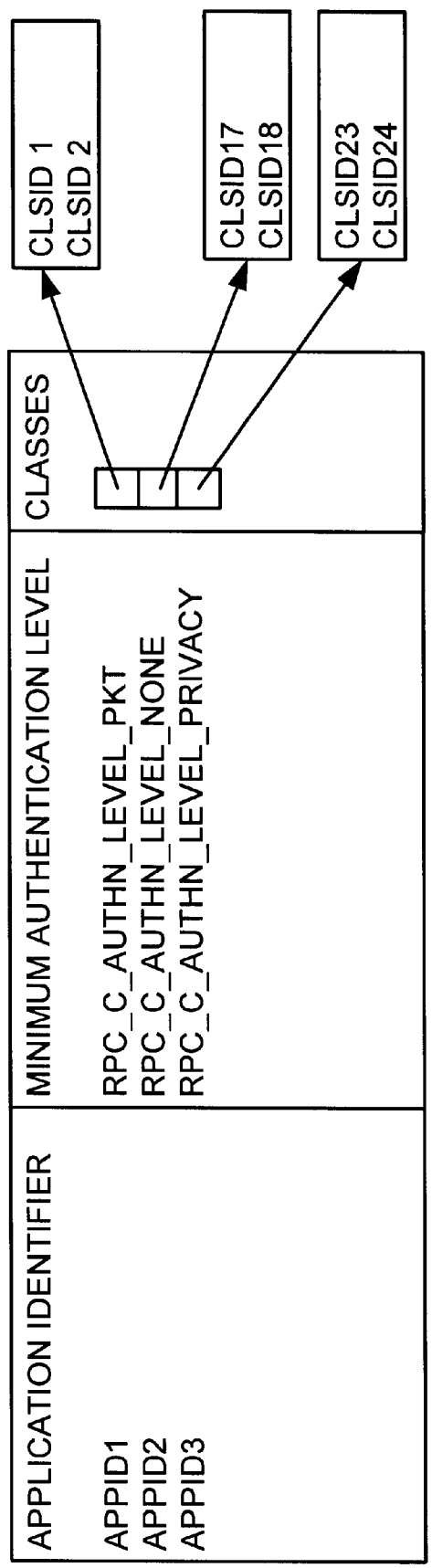
FIG. 12C is a block diagram showing a portion of the catalog related to applications.

FIG. 12C shows a third portion of the catalog listing the application identifier (APPID) of each application, the authentication level for calls to the application, and a list of class identifiers (CLSIDs) belonging to the application. In the example shown, AppId1 requires a minimum authentication level of RPC_C_AUTHN_-LEVEL_PKT and consists of the objects represented by CLSID1 and CLSID2.

A hashing algorithm is used to quickly find an entry in the catalog for a particular method of an interface to a class of objects. The entries could alternatively be stored in a central configuration database in Windows NT called the registry.

Overview of Object Contexts, Activators, Policy Makers, and Policies

The following description details an implementation of the security framework in a COM+ environment supporting object contexts and related services. An example of object instantiation in an environment 702 supporting object contexts is shown in FIG. 13.

In the example, the two objects 744 and 784 are members of different applications. When the object 744 (also called a client object) wishes to access the functionality of the object 784 (also called a server object), it does so by requesting an interface to an instantiated instance of the object 784. The reference is acquired by supplying the class identifier of the server object 784 to an enhanced version of the "CoCreateInstance( )" object creation API, which employs a chain of activators associated with the server object 784. The activators assemble a set of object context properties to define the object context in which the created object resides. The activators may be standard activators, or activators specific to the requested object class or the location (e.g., machine activators 704). In the illustrated example, automatic security has been set for the server object 784, and the catalog so indicates; so the security activator 754 is included in the activation chain when objects of the server object's class are instantiated. As shown in FIG. 13, the arrangement could be extended by including an optional security activator 714 on the client side. However, security could be implemented solely on either side (e.g., only on the server side). An alternative implementation uses a standard activator to determine whether automatic security is set for the object and sets an appropriate object context property indicating automatic security.

In some cases, traversal of the activation chain results in the server object 784 being created in the same object context as the client object 744 that requested its creation (i.e., the client object context 742). In other cases, the traversal results in the object 784 being created in another object context (i.e., a separate server object context 782). If the resulting object context does not yet exist, the activation chain creates the server object context 782 (i.e., by assembling appropriate object context property objects 760). In still other cases, the activation chain can terminate activation of the object (e.g., if security so requires), or defer activation.

Figure 13:
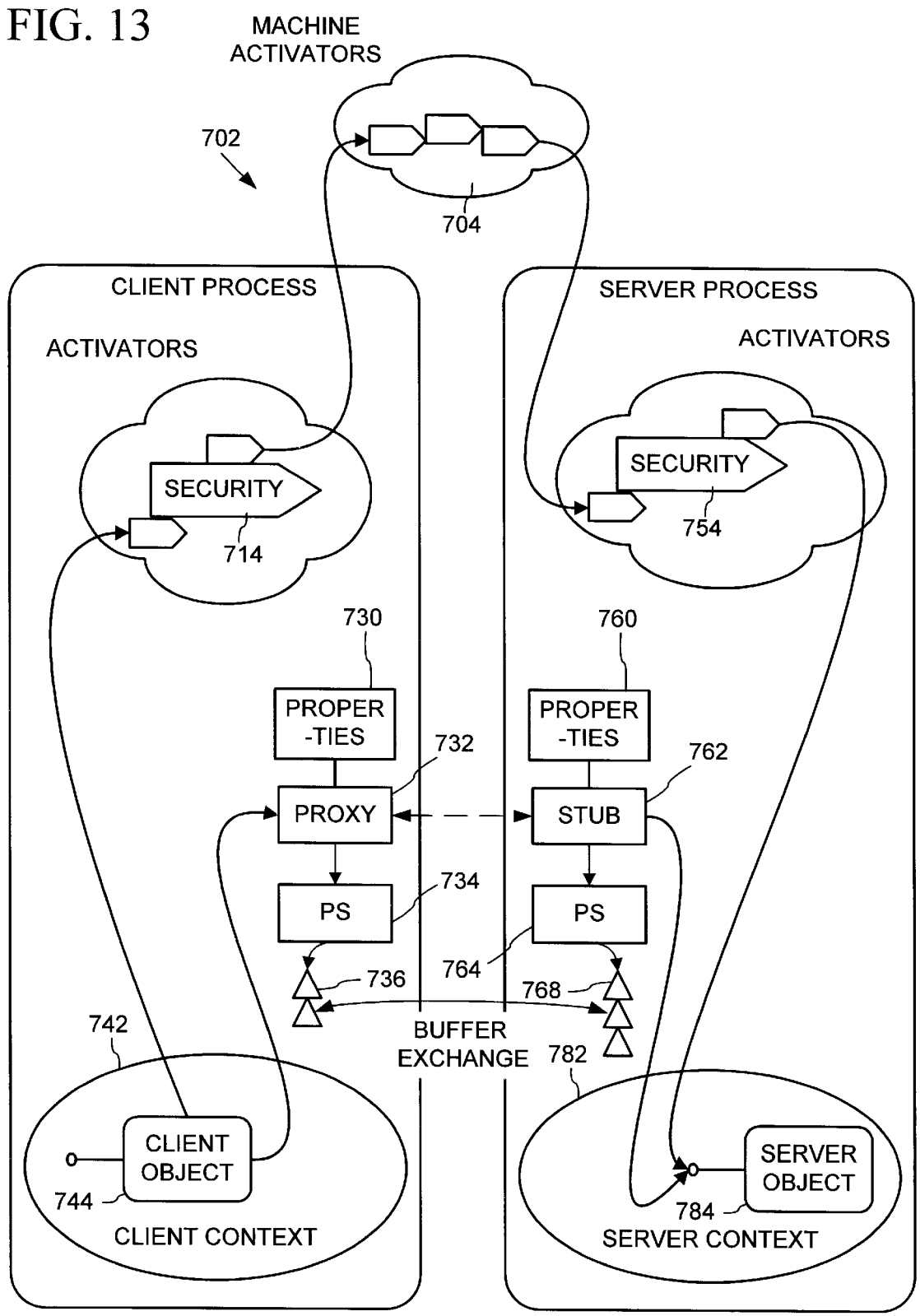
FIG. 13 is a block diagram illustrating object instantiation and method invocation in an environment supporting object contexts.

In the illustrated example of FIG. 13, the activation chain begins with an initial delegation to an activator (termed the "immediate activator") by the "CoCreateInstance( )" or other object creation API. This initial delegation by the "CoCreateInstance( )" API is to a class-specific activator (i.e., specific to the server object's class) if any is designated for the class. The class-specific activator can implement specific processing for the class during instantiation, such as setting particular object context properties (e.g., automatic security) when objects of the class are instantiated. Otherwise, if no class-specific activator is designated for the class, the "CoCreateInstance( )" API delegates to a default activator of the client object context 742. The default client object context activator can implement activation processing specific to a particular type of object context. For example, object contexts that incorporate particular domain-specific behaviors (e.g., automatic security) can provide a default activator to set object context properties specific to the behaviors (such as to screen inter-application calls). Finally, if the client object context 742 does not provide a default activator, the "CoCreateInstance( )" API initially delegates to a default object context activator.

The activators in the activation chain determine in which object context an object will reside by assembling a set of object context properties (e.g., the process in which an object resides and the application to which an object belongs). The object context properties are embodied in object context property objects, which can have a variety of interfaces. In the illustrated example, one of the object context property objects embodies an application identifier indicating to which application an object belongs.

After assembling the object context properties 730 and 760 of the object, the object context property objects having a policy maker interface (i.e., IPolicyMaker) are consulted and may contribute policies to the policy set. The policy set may be assembled at instantiation time, or alternatively be deferred until the reference to the server object 784 is first used (e.g., at unmarshaling time). The various policy set references 734 are available to the proxy 732, and the policy set references 764 are available to stub 762 on the server side. As a result, the proxy/stub arrangement functions as a wrapper between the client object 744 and the server object 784. Subsequently, when a cross-context object reference is used to access the interface to the server object 784, logic contained in the policies contributed to the object's policy set is executed automatically and transparently.

In the illustrated example, an object context property object for representing the application to which the server object belongs has a policy maker interface and contributes a security policy 736 to the policy set if two objects are in different applications, such as the server object 784 and the client object 744. If a call is made to the server object 784, the security policy 736 is automatically executed transparently to the caller and the called object; thus, security requirements for an object can be enforced even though the object itself contains no security logic.

Similarly, on the server side of the arrangement, a stub 762 has access to a security policy 768, which is placed in the policy set references 764. After instantiation is complete, the client object 744 is provided a reference to the proxy 732 instead of a direct reference to the server object 784. When a call is made to the server object 784, the proxy 732 marshals the call's parameters and relays the call to the stub 762, which unmarshals the parameters and relays the call to the server object 784. The proxy and stub automatically invoke the policies in the policy set at various stages during the call to the server object 784. Each policy has an interface (i.e., IPolicy) to which four events are sent: call, enter, leave, and return. Upon receiving the event, the policy executes logic particular to the event, if any. A method call to the server object 784 results in the following sequence of events:

TABLE 4

1. Issue method call from client program (e.g. object 744) to proxy
2. Issue call event to policies to client-side policy set
3. Direct call to stub
4. Issue enter event to server-side policy set
5. Execute object method, return results to stub
6. Issue leave event to client-side policy set
7. Return method results to proxy
8. Issue return event to client-side policy set
9. Return method results to client program Calls to the policies can result in termination of the steps listed above, thus effectively terminating the call. For example, a security policy called in step 4 could indicate a calling client object does not have access privileges, causing step 5 to be skipped (steps 6–9 would still execute, but they would be notified the call failed due to lack of access privileges).

In addition, the various policies can communicate via a buffer transfer mechanism. Finally, a policy can provide a result indicating the call not be forwarded to the server object 784, thereby enforcing a security boundary. The example of FIG. 13 shows a cross-process call; however, object contexts can be implemented in a single process, as described below and shown in FIG. 14.

Figure 14:
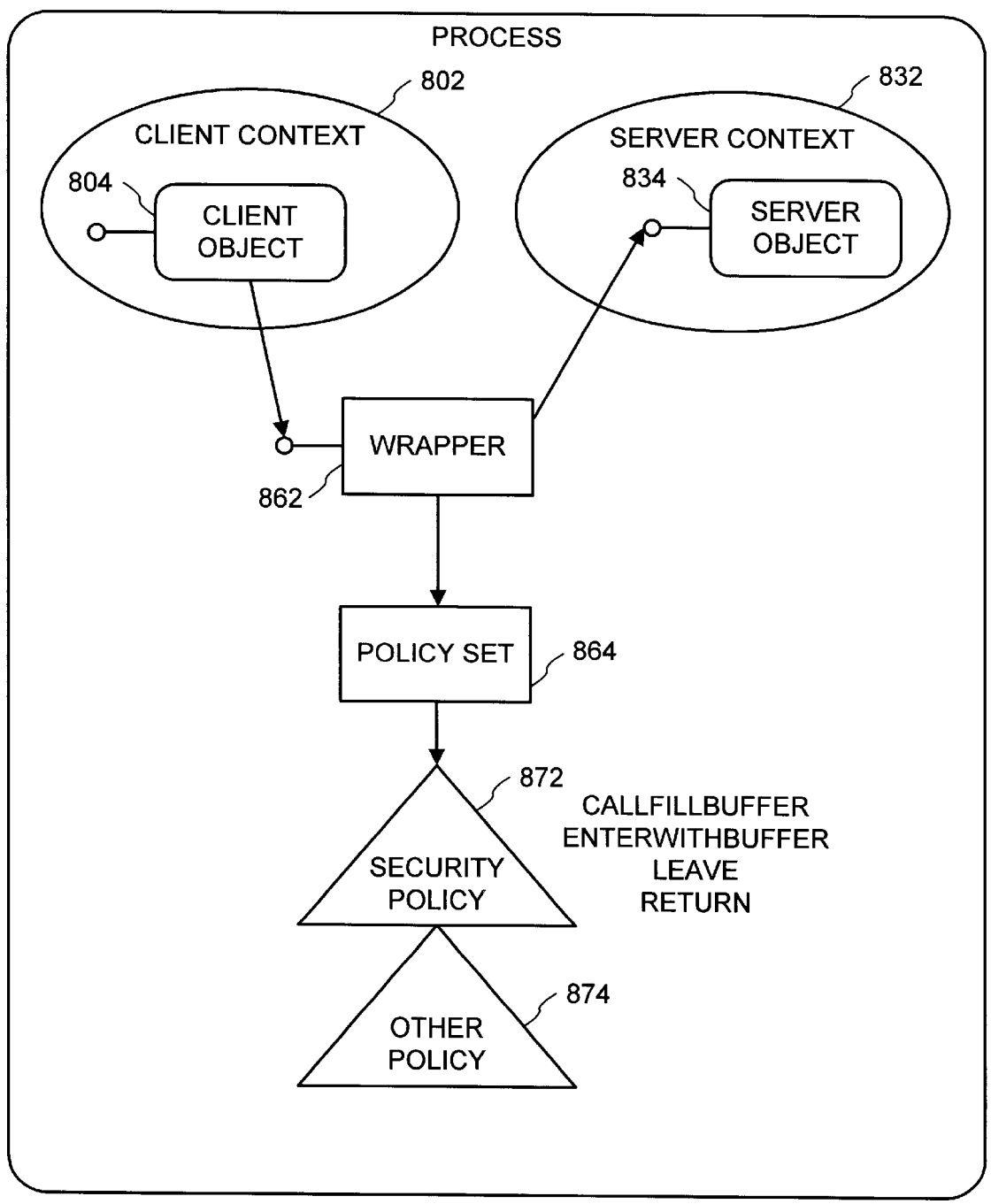
FIG. 14 is a block diagram illustrating a lightweight wrapper arrangement for supporting object contexts within a process.

FIG. 14 shows an exemplary arrangement employing a security policy in an intra-process call. Calls from the client object 804 to a server object 834 are first directed to a wrapper 862, which consults the policy set references 864, including a reference to a security policy 872 and another policy 874. A single security policy 872 can contain logic for call, enter, leave, and return events. The illustrated wrapper 862 is a lightweight replacement for a proxy-stub combination and does not marshal the parameters passed to the server object 834, except for interface pointers.

The wrapper 862 executes the security policy transparently to the objects 804 and 834. Another way of describing the arrangement of FIG. 14 is to assert the client object 804 is in an object context 802 and the server object 834 is in a different object context 832. Calls between the object contexts are automatically intercepted by the wrapper 862, providing a security boundary between the object contexts.

Exemplary Caller Chain Building with a Security Policy

Figure 15:
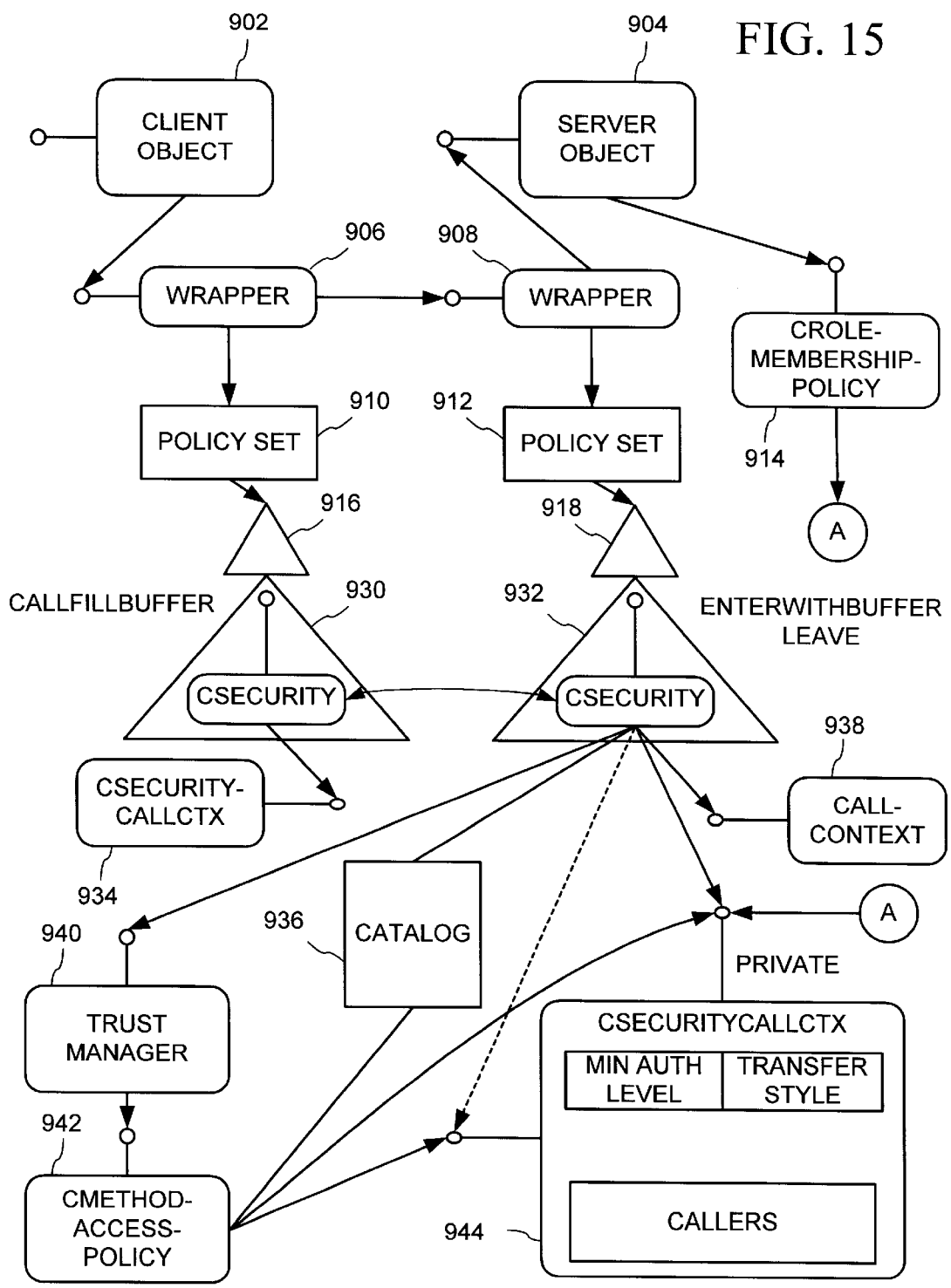
FIG. 15 is a block diagram illustrating an exemplary caller chain service.

An exemplary arrangement for providing a security framework in accordance with the invention is shown in FIG. 15. In the example, a client object 902 accesses the functionality of a server object 904 through a pair of wrappers 906 and 908 transparently interposed between the two objects during instantiation of the server object 904 as described above. The two objects 902 and 904 are of different applications. The client object 902 alternatively can be a base client instead of an object.

Various security information, such as a caller chain and a minimum authentication level (sometimes called the "security context") is stored in the security context objects 934 and 944. The security call context objects 934 and 944 expose various functions through a private interface to enhance security and control the transfer style for the security context. Various components can set the transfer style to "copy" using the private interface. Typically, direct access to the private interface by application objects (e.g., server object 904) is not allowed; rather, access is through some intermediary component (e.g., the role membership policy component 914 or a method invocation queue recorder or player).

To build the caller chain, the security framework uses a wrapper arrangement. The wrapper 906 accesses the policy set references 910, including a reference to the security policy (CSecurity) 930 automatically included in the policy set because the two objects are of different applications (i.e., they have different object context properties and reside in different object contexts). Another policy 916 is optionally included in the policy set. The interface presented by the wrapper 906 appears to the client object 902 to be the interface presented by the server object 904. When the security policy 930 is created, it receives the class identifier of the server object 904.

The wrapper 908 accesses policy set references 912, including a reference to the security policy (CSecurity) 932 automatically included in the policy set because the two objects are of different applications (i.e., they have different object context properties and reside in different object contexts). Another policy 918 is optionally included in the policy set. When the security policy 932 is created, it receives the class identifier of the server object 904.

When the client object 902 attempts to access a method of the server object 904, the wrapper 906 automatically sends a callfillbuffer event to the security policy 930. Upon receiving the callfillbuffer event, the security policy 930 acquires a reference to the security call context object 934, which keeps the security context for the client object 902. In the illustrated embodiment, the security context includes a list of callers and a minimum authentication level. An alternative implementation of a security context would be to maintain only a list of callers, without the minimum authentication level. If there is no security call context object, the policy 930 creates an empty one, or alternatively uses a NULL reference. Information in the security call context object 934, if any, and the transfer style currently specified in the security call context 934 is placed in a buffer, which is later transferred to the policy 932, as described below.

Typically, the determination of whether a call should be blocked is performed on the server side because the client logic may run on an untrusted system. However, calls can additionally be blocked on the client side by the security policy 930.

Figure 16:
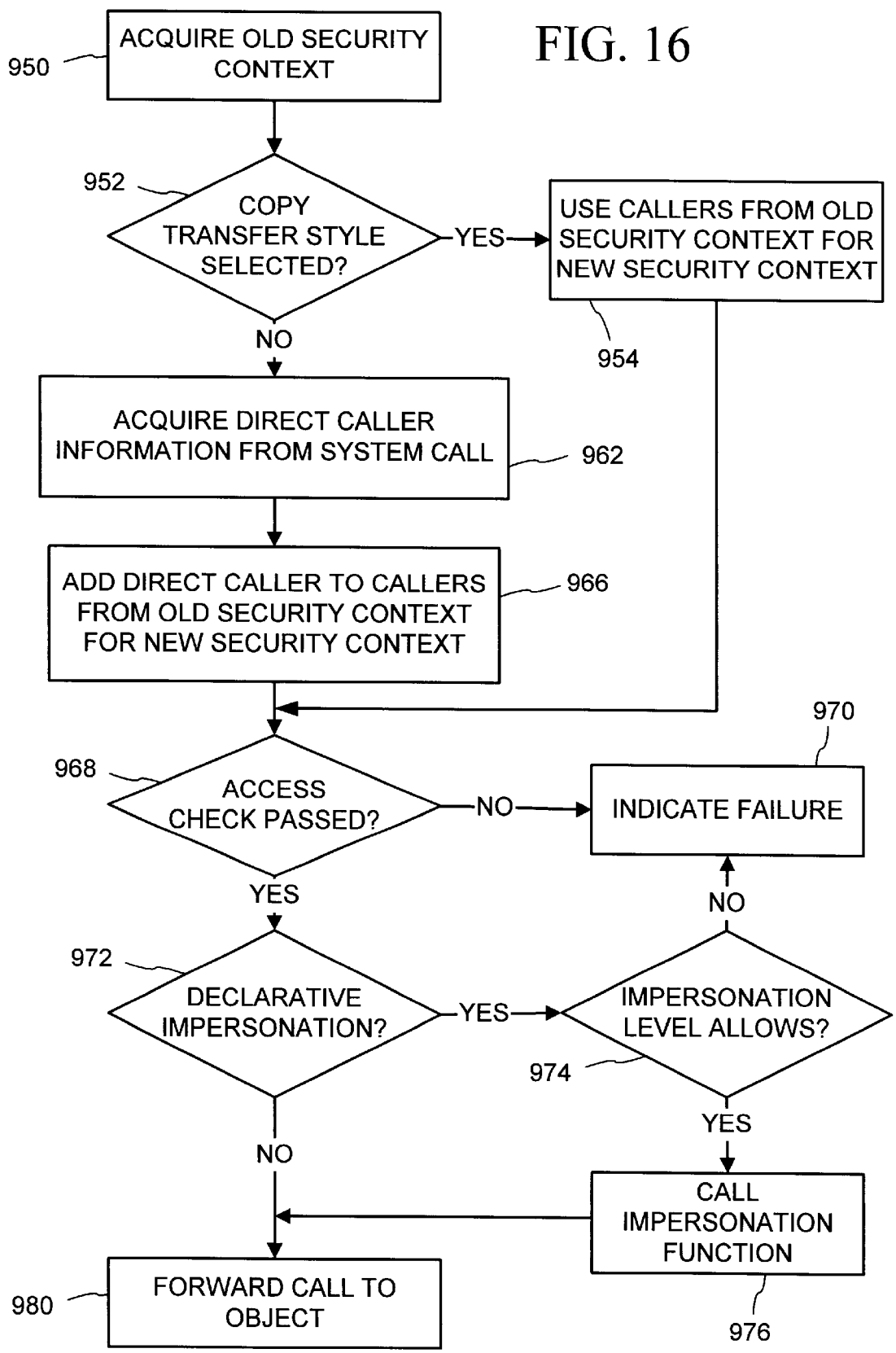
FIG. 16 is a flowchart of an exemplary method for providing a caller chain service.

When the call is forwarded to the wrapper 908, the wrapper sends an "enterwithbuffer" event to the security policy 932, providing the buffer to the security policy 932. A flowchart describing an exemplary method employed by the security policy 932 is shown in FIG. 16. The security policy 932 acquires the old security context (step 950), if any, from the buffer. The security policy 932 then determines whether the "copy" transfer style is selected based on a flag within the buffer (step 952).

If the "copy" transfer style is selected, the security policy 932 uses the caller chain (i.e., the structure "callers") from the old security context in the buffer for the new caller chain (step 954), which is stored in the callers structure of the security call context object 944, described in more detail below. An alternative implementation copies the entire security context for the client object 902 to the security context for the server object 904.

Otherwise, if the "normal" transfer style was selected, the policy 932 acquires direct caller information using a system call (e.g., CoGetCallContext) (step 962); the information is returned via a call context object 938. The call context is stored in the security call context object 932 and includes a reference to a token associated with the direct caller. The COM+ component of the operating system provides either the token associated with the calling object's process or the token associated with the calling object's thread, if any. The policy 932 then adds the direct caller indicated by the call context object 938 to the caller chain in the old security context and stores the resulting caller chain in the callers structure of the security call context object 944.

The security policy 932 also examines the authentication level associated with the incoming call, compares it with the minimum authentication level in the buffer (from the security call context object 934) and stores the lower value in the minimum authentication level variable of the security call context object 944.

The security policy 932 now compares the security context stored by the security call context object 944 with the values specified in the catalog to determine whether to allow the call to the server object 904 (step 968). The security call context object 944 exposes the caller chain by providing the following properties:

TABLE 5

| Property | Description |
| --- | --- |
| MinAuthLevel | The minimum authentication level used by any upstream call. |
| Callers | Callers.count = the number of callers; Callers( ) is a collection of identity collections, where Callers(0) = the direct caller and Callers(Callers.count-1) = the original caller. |
| NumCallers | shorthand for Callers.count |
| DirectCaller | shorthand for Callers(0) |
| OriginalCaller | shorthand for Callers(Callers.count-1) |

In the illustrated embodiment of FIG. 15, the security policy 932 employs a trust manager component 940 to perform the access check, passing a reference to the security call context object 944. The trust manager 940 in turn relays the access check to the method access policy component 942, which references the catalog and the security call context object to determine whether the call should be allowed (e.g., by determining if the authentication level is satisfied and whether the direct caller in the caller chain is in a permitted role as indicated in the catalog). To improve performance, the method access policy 942 can be configured to maintain a cache of catalog entries.

If the access check fails, the security policy 932 returns a result indicative of failure (step 970). The failure result is relayed back to the wrapper 906 and the client object 902.

If the access check passes, the security policy 932 checks the catalog to see if declarative impersonation was set for the server object 904 (or the interface or the method) (step 972). If so, a further check is made (step 974) to determine whether the client object 902 has set the impersonation level to one allowing impersonation (e.g., "RPC_C_IMP_LEVEL_IMPERSONATE"). If not, a result is returned to the wrapper 906 indicating failure (step 970), and the wrapper 906 relays the failure result to the client object 902. If the impersonation level is set high enough, the security policy 932 calls CoImpersonateClient (step 976) to cause impersonation to be in effect during the execution of the call to the server 904; calls from the server object 904 will appear to be originating from the client object 902.

Finally, the call is forwarded to the server object 904 (step 980). When the call completes, its results are relayed back through the wrapper arrangement to the client object 902. If the copy transfer style was selected, and the server object 904 calls a downstream object, the security context of the server object 904 will be propagated to downstream objects called by the server object 904. Thus, the call to the downstream object will appear to be coming from client object 902 instead of the server object 904.

Optionally, the server object 904 can programmatically access the security call context object 944 through a role membership policy component 914, which has access to the catalog 936 (the link to the catalog 936 is not shown). In this way, a developer can include system calls in server object 904 to access various functions (e.g., IsCallerInRole( )) to implement a custom security scheme taking advantage of the transparently built caller chain. The server object 904 can examine each caller in the caller chain (e.g., Callers(2)).

In the illustrated embodiment, a caller's identity is represented using an identity collection, which exposes the following properties:

TABLE 6

| Property | Description |
| --- | --- |
| SID | The security identifier. |
| Name | Usually dynamically derived from the SID. |
| Certificate | A certificate collection indicating the raw certificate data, flags, issuer, subject, serial number, and valid date range. |
| AuthenticationService | A value indicating the authentication service used to authenticate the caller. |
| AuthenticationLevel | A value indicating the authentication level used to authenticate the caller (e.g., RPC_C_AUTHN_LEVEL_NONE). |
| ImpersonationLevel | From the caller's impersonation token. |

In the illustrated embodiment, a reference to the security call context 944 is stored on thread local storage. In an alternative embodiment, the reference is stored by the security policy 932. Specifically, a mapping table mapping thread identifiers to references is used to account for the possibility that multiple threads may enter the policy. To account for the possibility that a thread may reenter the policy, a stack is used. An enterwithbuffer event pushes a reference to the stack, and the leave event pops a reference from the stack.

Various variations to the illustrated embodiment can be implemented to improve performance. For example, in cases where the security context is marshaled for transfer to another object context, the security context need not be unmarshalled immediately upon receiving a call. In some instances, portions of the information are not needed immediately or are seldom needed, so lazy unmarshalling is used. Lazy unmarshaling waits until the information is needed before unmarshaling it. If the information is not needed, it is not unmarshaled (or unmarshaling is accomplished by copying a marshaled version). Further, the outgoing security context can be cached, reducing the overhead for downstream calls.

With reference now to FIG. 6, the above-described caller chain mechanism can be used in conjunction with a method invocation queue to provide a caller chain across a method invocation queue. To account for the peculiarities of the method invocation queue t arrangement, the player 434 compares the security identifier of the sending object with the direct caller in the caller chain. If the two do not match (e.g., the sender is "recorder" but the direct caller is "B"), the player 434 will not allow the call unless the sender is on a list of trusted identities. In the illustrated example, the identity "Recorder" is in the list of trusted identities, so the call is allowed. This arrangement is sometimes called "transitive trust" because the player 434 effectively trusts another entity to implement a trust policy and determine B's identity securely. The caller chain 437 reconstructed on the other side of the queue 428 can be used for role-based security checks to enforce role-based security across the method invocation queue.

Finally, the caller chain can also be used in conjunction with auditing services. Typically, an auditing service records various actions within an application (e.g., method calls) and who performed the action. The auditing service also records security checks, and whether the check passed or failed. By using the caller chain described above to determine who initiated the action, more meaningful auditing is provided. For example, if a security check fails, the auditing service can record the entire caller chain, enabling an administrator to more effectively monitor an application's security.

Having described and illustrated the principles of our invention with reference to illustrated embodiments, it will be recognized that the illustrated embodiments can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto:

We claim:

1. In an object runtime security services system for accommodating a plurality of secured objects on a computer, a computer-implemented method for providing a list of caller identities for a particular secured object called by a calling object in a chain of a plurality of calling programs, wherein each call directed to one of the secured objects is associated with an identity, the method comprising:

for each call directed to one of the secured objects, performing the steps:
  intercepting the call to redirect the call to the security services system;
  acquiring an identity associated with the call; and
  adding the identity associated with the call to the list of caller identities.

2. A computer-readable medium having computer-executable instructions for performing the steps of claim 1.

3. The method of claim 1 further comprising:
providing the list of caller identities to the particular secured object.

4. The method of claim 1 further comprising:
when intercepting a call to the particular secured object, performing an access check for the particular secured object by comparing an identity in the list of caller identities against a set of permitted identities; and
blocking the call directed to the particular secured object as a result of determining the identity is not in the set.

5. The method of claim 1 further comprising:
consulting the list of caller identities with the particular secured object to determine if access to the secured object is permitted.

6. The method of claim 1 wherein calls to the secured objects are associated with an authentication level, the method further comprising:

tracking a minimum authentication level for the list of caller identities;
when intercepting a call to the particular secured object, performing an access check for the particular secured object by comparing the minimum authentication level with a specified acceptable authentication level; and
blocking the call directed to the particular secured object as a result of determining the minimum authentication level does not satisfy the specified acceptable authentication level.

7. A computer-readable medium having computer-executable instructions for performing the steps of claim 6.

8. In a runtime security service, a computer-implemented method for building a called object's caller chain from a provided list of caller identities for a calling object, the method comprising:
receiving a caller chain transfer style;
receiving the provided list of caller identities for the calling object;
if the caller chain transfer style indicates copy, providing the provided list of caller identities for the calling object as the called object's caller chain; and
if the caller chain transfer style does not indicate copy, performing the following steps:
  acquiring an identity associated with the calling object; and
  providing the provided list of caller identities for the calling object with the identity associated with the calling object added thereto as the called object's caller chain.

9. The method of claim 8 wherein the called object's caller chain is provided responsive to a request for a caller chain from the called object.

10. The method of claim 8 wherein a most recently added caller in the called object's caller chain is provided responsive to a request for the direct caller to the called object.

11. The method of claim 8 further comprising:
specifying a caller chain transfer style of copy with a method invocation queue recorder before traversing a method invocation queue; and
specifying a caller chain transfer style of copy with a method invocation queue player after traversing a method invocation queue.

12. The method of claim 11 wherein identities in a role's membership are permitted to access the called object, the method further comprising:
blocking a call to the called object if a direct caller in the called object's caller chain indicates an identity not in the role's membership.

13. A computer-implemented method of providing security services during a series of calls to a plurality of objects, the method comprising performing the following steps for each of the calls:
receiving an incoming call directed to a method of a secured object, wherein the call is associated with a value indicative of a transfer style and an incoming list of caller identities;
if the value indicative of a transfer style indicates a copy transfer style, storing the incoming list of caller identities in a caller list for the secured object;
if the value indicative of a transfer style does not indicate a copy transfer style, consulting a system service to determine an identity associated with the incoming call and storing the incoming list of caller identities and the identity associated with the incoming call in the caller list for the secured object;

consulting the caller list for the secured object to determine if a most recently added caller in the caller list is permitted to access the method;

blocking the call directed to the method if the caller is not permitted; and if the call is permitted, forwarding the call to the secured object.

14. A computer-implemented method of securely transferring a list of caller identities for an object across a method invocation queue, wherein the list of caller identities comprises a direct caller identity most recently added to the caller identities, and the list of caller identities is sent into the method invocation queue by a sending object associated with a sender identity, the method comprising:

upon retrieving the list of caller identities from the queue, determining if the direct caller identity matches the sender identity; and if the direct caller identity does not match the sender identity, consulting a list of trusted identities; and blocking transfer of the list of caller identities if the sender identity is not in the list of trusted identities.

15. The method of claim 14 wherein the sending object is a method invocation queue recorder and the determining step is performed for a method invocation queue player.

16. The method of claim 14 wherein the list of trusted identities is specified using a graphical user interface and stored in a central security settings store outside the object.

17. A computer-readable medium having computer-executable instructions for performing the steps of claim 16.

18. A method for providing an impersonation service in a security framework accommodating objects, wherein calls to the objects are each associated with an identity, the method comprising:

at development time, specifying an object impersonates its callers by designating an impersonation setting;

storing the impersonation setting outside the object in a security setting store;

at runtime, intercepting a call directed to the object to determine if the impersonation setting indicates the object impersonates callers; and responsive to a request for an identity for calls from the object, providing an identity associated with the call directed to the object as a result of consulting the impersonation setting if the impersonation setting indicates the object impersonates callers.

19. The method of claim 18 wherein the identity associated with the call directed to the object has an impersonation level, the method further comprising:

blocking the call directed to the object if the impersonation level indicates the identity associated with the call is not to be impersonated.

20. The method of claim 18 wherein the security setting indicates a particular method of the object designated as impersonating callers to the method.

21. A security framework for providing runtime security services to a plurality of secured programming objects, the framework comprising:

a store of security settings indicating whether one of the secured programming objects automatically impersonates callers;

a graphical user interface graphically depicting the secured programming object; and a graphical user interface control for designating the secured programming object as automatically impersonating callers thereto and operative to modify the store indicate the secured programming object automatically impersonates callers.

22. The security framework of claim 21 wherein the graphical user interface control is operative to designate a particular method of the secured programming object as automatically impersonating callers and to designate another method of the secured programming object as not automatically impersonating callers.

23. A security framework for providing runtime security services to a plurality of secured objects, the framework comprising:

a list of caller identities associated with each call to a secured object;

a security context object for receiving and recording a caller chain transfer style;

a caller chain builder operative to provide a copy of the list of caller identities associated with a call from a first secured object responsive to a request for the list of caller identities associated with a call to a second secured object if the security context object indicates a caller chain transfer style of copy;

a wrapper positioned to intercept a call directed to the second secured object, invoke the caller chain builder upon intercepting the call, and selectively forward the call to the second object; and an activator operative to execute responsive to a request for access to the second secured object and interpose the wrapper between the first secured object and the second secured object.

24. The security framework of claim 23 wherein the security context object is operative to receive the caller chain transfer style from the first secured object through a private interface.

25. The security framework of claim 24 wherein the list of caller identities associated with a call to the second secured object comprises a direct caller, the security framework further comprising:

a security settings store comprising a set of identities permitted to access the second secured object;

an access checker operative to receive the direct caller from the caller chain builder, compare the list of identities associated with the set of permitted identities, and selectively block the call directed to the second secured object if the set of permitted identities does not include the direct caller.

26. The security framework of claim 25 wherein the set of permitted identities is generated by binding a list of users specified at deployment time of an application to a logical class of users specified at development time of the application.

* * * * *

UNITED STATES PATENT AND TRADEMARK OFFICE
CERTIFICATE OF CORRECTION

PATENT NO.    : 6,385,724 B1
DATED         : May 7, 2002
INVENTOR(S)   : Beckman et al.

It is certified that error appears in the above-identified patent and that said Letters Patent is hereby corrected as shown below:

Title page,
Item [22], the following references should be listed:
-- U.S. Application No. 09/071,594.
U.S. Application No. 09/197,226.
U.S. Application No. 09/135,397.
U.S. Application No. 09/135,106.
U.S. Application No. 09/197,080.
U.S. Application No. 09/197,211.
U.S. Application No. 09/196,836.
U.S. Application No. 09/197,009.
U.S. Application No. 09/197,246.
U.S. Application No. 09/197,242.
U.S. Application No. 09/196,974.
U.S. Application No. 09/328,683. --
Item [56], OTHER PUBLICATIONS, "Programmin" should read -- Programming --;
"Transormation" should read -- Transformation --;
"igital" should read -- Digital --; and
"*IEEEE*," should read -- *IEEE*, --.

Column 12,
Line 8, Table 1, "this, see" should read -- see --.

Column 14,
Line 27, Table 3, "business logic function" should read -- business logic – function --.

Signed and Sealed this

Thirtieth Day of September, 2003

JAMES E. ROGAN
*Director of the United States Patent and Trademark Office*